US012633968B2

(12) United States Patent
Duarte Gelvez et al.

(10) Patent No.: US 12,633,968 B2
(45) Date of Patent: May 19, 2026

(54) ESTIMATION OF A RADIO CHANNEL IN PRESENCE OF A CONTROLLABLE SCATTERER

(71) Applicant: HUAWEI TECHNOLOGIES CO., LTD., Shenzhen (CN)

(72) Inventors: Melissa Duarte Gelvez, Boulogne Billancourt (FR); Mustapha Amara, Boulogne Billancourt (FR); Mohamed Kamoun, Boulogne Billancourt (FR); Maxime Guillaud, Boulogne Billancourt (FR); Paul Ferrand, Boulogne Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 204 days.

(21) Appl. No.: 18/473,815

(22) Filed: Sep. 25, 2023

(65) Prior Publication Data

US 2024/0014864 A1 Jan. 11, 2024

Related U.S. Application Data

(63) Continuation of application No. PCT/EP2021/057912, filed on Mar. 26, 2021.

(51) Int. Cl.
*H04B 7/04* (2017.01)
*H04L 25/02* (2006.01)

(52) U.S. Cl.
CPC ..... *H04B 7/04013* (2023.05); *H04L 25/0204* (2013.01); *H04L 25/0224* (2013.01)

(58) Field of Classification Search
CPC ............ H04B 7/04013; H04L 25/0204; H04L 25/0224
See application file for complete search history.

(56) References Cited

U.S. PATENT DOCUMENTS

2022/0077919 A1* 3/2022 Li ............................ H04B 7/04
2023/0318177 A1* 10/2023 Zhou ................... H04L 25/0204
455/456.1

(Continued)

OTHER PUBLICATIONS

Mishra et al., "Channel Estimation and Low-complexity Beamforming Design for Passive Intelligent Surface Assisted MISO Wireless Energy Transfer," ICASSP 2019—2019 IEEE International Conference on Acoustics, Speech and Signal Processing (ICASSP), Brighton, UK, pp. 4659-4663, doi: 10.1109/ICASSP.2019.8683663 (May 12-17, 2019).

(Continued)

*Primary Examiner* — David B Lugo
(74) *Attorney, Agent, or Firm* — Leydig, Voit & Mayer, Ltd.

(57) ABSTRACT

A radio channel may comprise a first component between two devices, and second and third components via the controllable scatterer. First reference signal(s) may be transmitted with the controllable scatterer configured to alter a propagation of signals such that influence of the second and third components of the radio channel is mitigated. Second reference signal(s) may be transmitted with the controllable scatterer configured to alter a propagation of signals such that influence of the second and third components of the radio channel is increased. An estimate of the first component may be determined based on the first reference signal(s) and an estimate of the third component may be determined based on the second reference signal(s) and a pre-computed estimate of the second component.

19 Claims, 9 Drawing Sheets

(56)                  References Cited

U.S. PATENT DOCUMENTS

| 2024/0048214 | A1* | 2/2024 | Kwon | ..................... | H04B 7/088 |
| 2024/0162960 | A1* | 5/2024 | Åström | ................ | H04B 7/0617 |

OTHER PUBLICATIONS

Alexandropoulos et al. "A Hardware Architecture for Reconfigurable Intelligent Surfaces with Minimal Active Elements for Explicit Channel Estimation," ICASSP 2020—2020 IEEE International Conference on Acoustics, Speech and Signal Processing (ICASSP), Barcelona, Spain, arXiv: 2002.10371v1[cs.IT], total 5 pages (Feb. 24, 2020).

Arun et al., "RFocus: Beamforming Using Thousands of Passive Antennas," IProceedings of the 17th Usenix Conference on Networked Systems Design and Implementation (NSDI'20), Usenix Association, Santa Clara, CA, USA, total 17 pages (Feb. 25-27, 2020).

Dunna et al., "ScatterMIMO: Enabling Virtual MIMO with Smart Surfaces," Proceedings of the 26th Annual International Conference on Mobile Computing and Networking (MobiCom '20), Association for Computing Machinery, New York, NY, USA, Article 10, total 14 pages (Sep. 21-25, 2020).

He et al., "Cascaded Channel Estimation for Large Intelligent Metasurface Assisted Massive MIMO," IEEE Wireless Communications Letters, vol. 9, No. 2, total 5 pages (Feb. 2020).

Hu et al., "Two-Timescale Channel Estimation for Reconfigurable Intelligent Surface Aided Wireless Communications," EEE Transactions on Communications, vol. 69, No. 11, arXiv: 1912.07990v2[eess. SP], total 22 pages (May 18, 2020).

Jensen et al., "An Optimal Channel Estimation Scheme for Intelligent Reflecting Surfaces Based on a Minimum Variance Unbiased Estimator," ICASSP 2020—2020 IEEE International Conference on Acoustics, Speech and Signal Processing (ICASSP), Barcelona, Spain, pp. 5000-5004, doi: 10.1109/ICASSP40776.2020.9053695 (May 4-8, 2020).

Mirza et al., "Channel Estimation Method and Phase Shift Design for Reconfigurable Intelligent Surface Assisted MIMO Networks," IEEE Transactions on Cognitive Communications and Networking, arXiv: 1912.10671v2[cs.IT], total 10 pages (Jun. 1, 2020).

Nadeem et al., "Intelligent Reflecting Surface-Assisted Multi-User MISO Communication: Channel Estimation and Beamforming Design," IEEE Open Journal of the Communications Society, vol. 1, total 20 pages (Jun. 5, 2020).

You et al., "Channel Estimation and Passive Beamforming for Intelligent Reflecting Surface: Discrete Phase Shift and Progressive Refinement," IEEE Journal on Selected Areas in Communications, vol. 38, No. 11, pp. 2604-2620, doi: 10.1109/JSAC.2020.3007056 (Nov. 2020).

Zheng et al., "Channel Estimation for Ambient Backscatter Communications with Large Intelligent Surface," 2019 11th International Conference on Wireless Communications and Signal Processing (WCSP), Xi'an, China, pp. 1-5, doi: 10.1109/WCSP.2019.8927865 (Oct. 23-25, 2019).

"DOCOMO Conducts World's First Successful Trial of Transparent Dynamic Metasurface." [online]https://www.docomo.ne.jp/english/info/media_center/pr/2020/0117_00.html, total 3 pages (Jan. 17, 2020).

* cited by examiner

1200

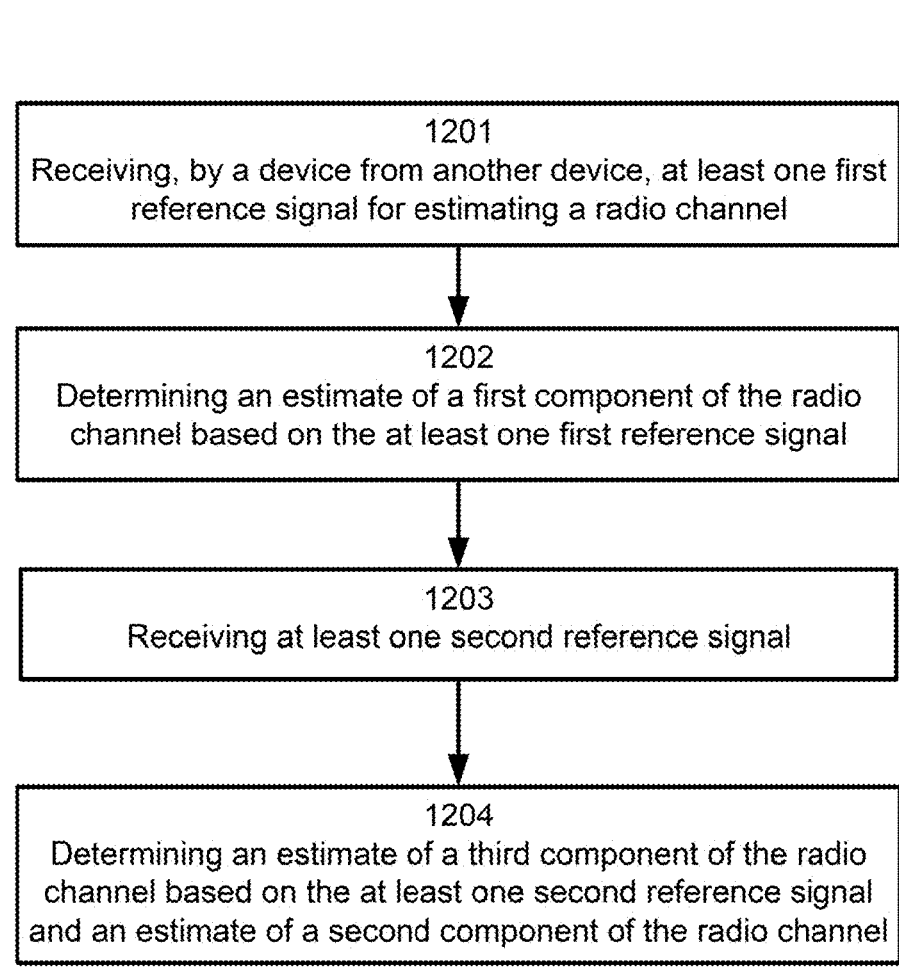

1201
Receiving, by a device from another device, at least one first reference signal for estimating a radio channel

1202
Determining an estimate of a first component of the radio channel based on the at least one first reference signal

1203
Receiving at least one second reference signal

1204
Determining an estimate of a third component of the radio channel based on the at least one second reference signal and an estimate of a second component of the radio channel

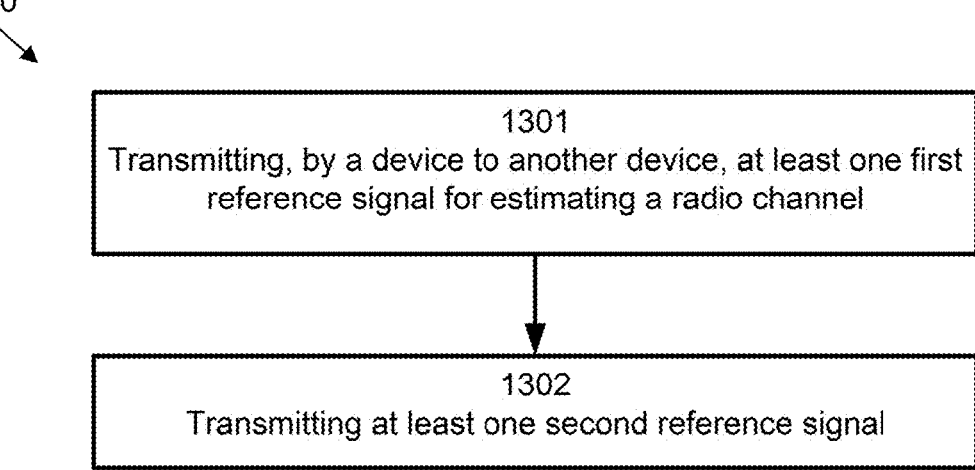

1301
Transmitting, by a device to another device, at least one first reference signal for estimating a radio channel

1302
Transmitting at least one second reference signal

FIG. 13

ESTIMATION OF A RADIO CHANNEL IN PRESENCE OF A CONTROLLABLE SCATTERER

CROSS-REFERENCE TO RELATED APPLICATIONS

This application is a continuation of International Application No. PCT/EP2021/057912, filed on Mar. 26, 2021, the disclosure of which is hereby incorporated by reference in its entirety.

FIELD

The present disclosure generally relates to wireless communications. In particular, some embodiments of the disclosure relate to the estimation of a radio channel.

BACKGROUND

In wireless communications, a signal may be transmitted over a radio channel, which may cause various unwanted alterations to the signal. In some applications, a digitally controllable scatterer (DCS) may be provided to affect the propagation of the signal through the radio channel. A DCS may be also referred to as a reconfigurable intelligent surface (RIS), an intelligent reflecting surface (IRS), a large intelligent surface (LIS), or a smart repeater. In order to successfully decode the transmitted data, a receiver may estimate the radio channel and compensate for the unwanted alterations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of the present disclosure to enable a low-complexity estimation of components of a radio channel in presence of a controllable scatterer. The foregoing and other objectives may be achieved by the features of the independent claims. Further implementation forms are apparent from the dependent claims, the description, and the figures.

According to a first aspect, a device is provided for estimating a radio channel. The device may be configured to receive, from another device, at least one first reference signal for estimating the radio channel, wherein the radio channel comprises a first component between the other device and the device, a second component via a controllable scatterer, and a third component via the controllable scatterer, wherein the controllable scatterer comprises a plurality of reflective elements configured to alter a propagation of the at least one first reference signal from the controllable scatterer to the device; determine an estimate of the first component of the radio channel based on the at least one first reference signal; receive at least one second reference signal, wherein the controllable scatterer is configured to alter a propagation of the at least one second reference signal from the controllable scatterer to the device; and determine an estimate of the third component of the radio channel based on the at least one second reference signal and an estimate of the second component of the radio channel. This solution enables a low-complexity implementation at the device to estimate components of the radio channel in presence of the controllable scatterer.

According to an implementation form of the first aspect, the device may be further configured to receive the estimate of the second component of the radio channel from the other device, wherein the second component of the radio channel is between the other device and the controllable scatterer, wherein the controllable scatterer is stationary with respect to the other device, and wherein the third component of the radio channel is between the controllable scatterer and the device. This solution enables a low-complexity channel estimation at the device, when the device is in the far field of the controllable scatterer.

According to an implementation form of the first aspect, the device may be further configured to determine the estimate of the second component of the radio channel based on distances between at least one antenna of the device and the plurality of reflective elements of the controllable scatterer, wherein the second component of the radio channel is between the device and the controllable scatterer, wherein the controllable scatterer is stationary with respect to the device, and wherein the third component of the radio channel is between the controllable scatterer and the other device. This solution enables a low-complexity channel estimation at the device, when the device is in the near field of the controllable scatterer.

According to an implementation form of the first aspect, the controllable scatterer may be configured with a first configuration of a plurality of controllable phase shifts to restrict the propagation of the at least one first reference signal from the controllable scatterer to the device. This solution enables the influence of the second and third components of the radio channel to be mitigated to improve the estimation of the first component of the radio channel.

According to an implementation form of the first aspect, in the first configuration of the plurality of controllable phase shifts, the controllable scatterer may be configured to direct the at least one first reference signal away from the device or to spatially disperse energy of the at least one first reference signal. However, the influence of the first component of the radio channel may not be affected by this. This solution enables the influence of the second and third components of the radio channel to be mitigated when the location of the device with respect to the controllable scatterer is known or unknown.

According to an implementation form of the first aspect, the device may be further configured to determine the first configuration of the plurality of controllable phase shifts based on minimizing a first utility function with respect to a plurality of candidate configurations of the plurality of controllable phase shifts. This solution enables a utility function based implementation for mitigating the influence of the second and third components of the radio channel.

According to an implementation form of the first aspect, the first utility function comprises $$\sum_{i=1}^{i=N_1} \left\| H_i^{FF} F(\phi) H_{NF} \right\|^2 \text{ or } \sum_{i=1}^{i=N_1} \left\| H_{NF} F(\phi) H_i^{FF} \right\|^2, \text{ wherein } H_i^{FF}$$

is an i-th member of a first codebook of $N_1$ channel matrices of the third component of the radio channel, $F(\phi)$ is one of the plurality of candidate configurations of the plurality of controllable phase shifts ($\phi$), and $H_{NF}$ is the estimate of the second component of the radio channel. This solution enables a low-complexity codebook-based implementation for mitigating the influence of the second and third components of the radio channel.

According to an implementation form of the first aspect, in the first configuration of the plurality of controllable phase shifts, the controllable scatterer may be configured to sequentially apply different combinations of the plurality of controllable phase shifts, and the device may be further configured to determine the estimate of the first component of the radio channel based on a plurality of observations corresponding to the different combinations of the plurality of controllable phase shifts. This solution enables a mitigation of the influence of the second and third components of the radio channel over a number of sequential configurations, for example, when the location of the device with respect to the controllable scatterer is unknown.

According to an implementation form of the first aspect, in a first configuration of the plurality of controllable phase shifts, the controllable scatterer may be configured to sequentially apply a first filter defined by a set of controllable phase shifts $F(\phi)$ and a first opposite filter $-F(\phi)$, and the device may be further configured to determine the estimate of the first component of the radio channel based on adding estimates of a composite radio channel corresponding to the first filter $F(\phi)$ and the first opposite filter $-F(\phi)$. This solution enables a low-complexity addition-based mitigation of the second and third components of the radio channel.

According to an implementation form of the first aspect, the controllable scatterer may be configured with a second configuration of a plurality of controllable phase shifts to enhance the propagation of the at least one second reference signal from the controllable scatterer to the device. This solution enables the influence of the third component of the radio channel to be enhanced to improve an estimation of the third component of the radio channel.

According to an implementation form of the first aspect, the device may be further configured to transmit, to the controllable scatterer, at least one of: the first configuration of the plurality of controllable phase shifts for use during transmission of the at least one first reference signal, wherein the first configuration of the plurality of controllable phase shifts comprises one or more first sets of the controllable phase shifts, the second configuration of the plurality of controllable phase shifts for use during transmission of the at least one second reference signal, wherein the second configuration of the plurality of controllable phase shifts comprises one or more second sets of the controllable phase shifts, instructions to turn off the controllable scatterer for a first time period comprising transmission of the at least one first reference signal, instructions to apply the first configuration of the plurality of controllable phase shifts at the first time period, and instructions to apply the second configuration of the plurality of controllable phase shifts at a second time period comprising transmission of the at least one second reference signal. This solution enables a dynamic configuration of the controllable scatterer for estimating the components of the radio channel.

According to an implementation form of the first aspect, in the second configuration of the plurality of controllable phase shifts, the controllable scatterer is configured to direct the at least one second reference signal towards the device. This solution enables enhancing the influence of the third component of the radio channel, when the location of the device with respect to the controllable scatterer is known.

According to an implementation form of the first aspect, the device may be further configured to determine the second configuration of the plurality of controllable phase shifts based on maximizing a second utility function with respect to a plurality of candidate configurations of the plurality of controllable phase shifts. This solution enables a utility function based implementation for enhancing the influence of the third component of the radio channel.

According to an implementation form of the first aspect, the second utility function comprises $$\sum_{i=1}^{i=N_2}\left\|H_i^{FF}F(\phi)H_{NF}\right\|^2 \text{ or } \sum_{i=1}^{i=N_2}\left\|H_{NF}F(\phi)H_i^{FF}\right\|^2, \text{ wherein } H_i^{FF}$$

is an i-th member of a second codebook of $N_2$ channel matrices of the third component of the radio channel, $F(\phi)$ is one of the plurality of candidate configurations of the plurality of controllable phase shifts ($\phi$), and $H_{NF}$ is the estimate of the second component of the radio channel. This solution enables a low-complexity codebook-based implementation for enhancing the influence of the third component of the radio channel.

According to an implementation form of the first aspect, the first codebook may be equal to the second codebook. This solution further reduces the complexity of mitigating the influence of the first component and enhancing the influence of the third component of the radio channel.

According to an implementation form of the first aspect, the device may be further configured to determine an estimate of a composite radio channel, H, based on the at least one second reference signal; and determine an estimate of the third component of the radio channel based on minimizing a third utility function with respect to a plurality of candidate estimates of the third component of the radio channel. This solution enables a low-complexity utility function based implementation for estimating the third component of the radio channel.

According to an example embodiment, the third utility function comprises $\|H-H_0-H_{FF}F_2(\phi)H_{NF}\|$ or $\|H-H_0-H_{NF}F_2(\phi)H_{FF}\|$, wherein $H_0$ is the estimate of the first component of the radio channel, $H_{FF}$ is a candidate estimate of the third component of the radio channel, $F_2(\phi)$ is a second filter defined by a set of controllable phase shifts of the second configuration of the plurality of controllable phase shifts, and $H_{NF}$ is the estimate of the second component of the radio channel. This solution enables a low-complexity utility function based implementation for estimating the third component of the radio channel.

According to an implementation form of the first aspect, in the second configuration of the plurality of controllable phase shifts, the controllable scatterer may be configured to sequentially apply the second filter defined by the set of controllable phase shifts $F_2(\phi)$ and a second opposite filter $-F_2(\phi)$, and the device may be further configured to determine the estimate of the third component of the radio channel based on subtracting estimates of the composite radio channel corresponding to the second filter $F_2(\phi)$ and the second opposite filter $-F_2(\phi)$. This solution enables a low-complexity subtraction-based enhancement of the influence of the third component of the radio channel.

According to an implementation form of the first aspect, in the second configuration of the plurality of controllable phase shifts, the controllable scatterer may be configured to sequentially apply the second filter defined by the set of controllable phase shifts $F_2(\phi)$ and a second opposite filter $-F_2(\phi)$, and the device may be further configured to determine the estimate of the first component of the radio channel based on adding estimates of the composite radio channel corresponding to the second filter $F_2(\phi)$ and the second opposite filter $-F_2(\phi)$. This solution enables a low-complexity addition-based estimation of the first component of the radio channel.

According to an implementation form of the first aspect, the plurality of candidate estimates of the third component of the radio channel may equal to the second codebook of $N_2$ channel matrices of the third component of the radio channel. This solution further reduces the complexity of estimating the third component of the radio channel.

According to an implementation form of the first aspect, the device may be further configured to determine a plurality of estimates of a composite radio channel based on a plurality of second reference signals; determine a plurality of estimates of the third component of the radio channel, $H_{FF}$, wherein the plurality of estimates of the third component of the radio channel and the second configuration of the plurality of controllable phase shifts, $F_2(\phi)$, are determined based on $H_{FF}$, $$F_2(\phi) = \arg\max_{H_i^{FF} \in \mathcal{H}, \{F(\phi)\}} f(\{H[k] - H_0\}_{k \in 1 \ldots K}),$$

wherein $H[k]$ is a k-th estimate among K estimations of the composite radio channel, $H_i^{FF}$ is an i-th member of a codebook $\mathcal{H}$ of channel matrices of the third component of the radio channel, and $\{F(\phi)\}$ comprises a plurality of candidate configurations of the plurality of controllable phase shifts; and determine the estimate of the third component of the radio channel based on the plurality of estimates of the third component of the radio channel. This solution enables a joint selection of the controllable phase shifts to enhance the influence of the third component of the radio channel and the estimation of the third component.

According to an implementation form of the first aspect, the device may be further configured to determine the second configuration of the plurality of controllable phase shifts, $F_2(\phi)$, based on $$F_2(\phi) = \arg\max_{\{F(\phi)\}} \|H_{NF}F(\phi)\|^2 \text{ or } F_2(\phi) = \arg\max_{\{F(\phi)\}} \|F(\phi)H_{NF}\|^2,$$

wherein $H_{NF}$ is the estimate of the second component of the radio channel and $\{F(\phi)\}$ comprises a plurality of candidate configurations of the plurality of controllable phase shifts; determine an estimate of a composite radio channel, H, based on the at least one second reference signal; and determine the estimate of the third component of the radio channel, $H_{FF}$, based on $H_{FF} = (H - H_0)(F_2(\phi)H_{NF})^\dagger$ or $H_{FF} = (H_{NF}F_2(\phi))^\dagger(H - H_0)$, wherein $H_0$ is the estimate of the first component of the radio channel, and $(\ )^\dagger$ denotes pseudo inverse of a matrix. This solution enables the enhancement of the influence of the third component of the radio channel based on near-field information only and an inversion-based implementation for estimating the third component of the radio channel.

According to an implementation form of the first aspect, the device may be further configured to determine the second configuration of the plurality of controllable phase shifts, $F_2(\phi)$, based on maximizing the plurality of controllable phase shifts over $\mathbb{E}_{H_{FF}}\{\|H_{NF}F(\phi)H_{FF}\|^2\}$ computed over a distribution of the third component of the radio channel, $H_{FF}$, wherein $H_{NF}$ is the estimate of the second component of the radio channel, and $\mathbb{E}_{\{\ \}}\{\ \}$ is an expectation operator; determine an estimate of a composite radio channel, H, based on the at least one second reference signal; and determine the estimate of the third component of the radio channel, $H_{FF}$, based on $H_{FF} = (H - H_0)(F_2(\phi)H_{NF})^\dagger$ or $H_{FF} = (H_{NF}F_2(\phi))^\dagger(H - H_0)$, wherein $H_0$ is the estimate of the first component of the radio channel, and $(\ )^\dagger$ denotes pseudo inverse of a matrix. This solution enables the enhancement of the influence of the third component of the radio channel and the estimation of the third component of the radio channel based on probabilistic information collected, for example, through measurements.

According to an implementation form of the first aspect, the device may be further configured to configure a communication between the device and the other device based on the estimate of the third component of the radio channel; or transmit the estimate of the third component of the radio channel to the other device. This solution enables the communication between devices to be optimized, for example, to increase throughput.

According to an implementation form of the first aspect, the device may be further configured to transmit the estimate of the composite radio channel to the other device. This solution enables estimation of the third component of the radio channel at the other device, for example, in case of closed-loop communication or communication with transmitter side information.

According to a second aspect, a device is provided for enabling an estimation of a radio channel. The device may be configured to transmit, to another device, at least one first reference signal for estimating the radio channel, wherein the radio channel comprises a first component between the device and the other device, a second component via a controllable scatterer, and a third component via the controllable scatterer, wherein the controllable scatterer comprises a plurality of reflective elements configured to alter a propagation of the at least one first reference signal from the controllable scatterer to the other device; and transmit at least one second reference signal, wherein the controllable scatterer is configured to alter a propagation of the at least one second reference signal from the controllable scatterer to the other device. This solution enables a low-complexity implementation at another device to estimate components of the radio channel in presence of the controllable scatterer.

According to an implementation form of the second aspect, the device may be further configured to determine the estimate of the second component of the radio channel based on distances between at least one antenna of the device and the plurality of reflective elements of the controllable scatterer, wherein the second component of the radio channel is between the device and the controllable scatterer, wherein the controllable scatterer is stationary with respect to the device, and wherein the third component of the radio channel is between the controllable scatterer and the other device; and transmit the estimate of the second component of the radio channel to the other device. This solution enables a low-complexity channel estimation at the other device, when the device is in the near field of the controllable scatterer.

According to an implementation form of the second aspect, the controllable scatterer may be configured with a first configuration of a plurality of controllable phase shifts to restrict the propagation of the at least one first reference signal from the controllable scatterer to the other device. This solution enables the influence of the second and third components of the radio channel to be mitigated to improve the estimation of the first component of the radio channel.

According to an implementation form of the second aspect, in the first configuration of the plurality of controllable phase shifts, the controllable scatterer is configured to direct the at least one first reference signal away from the other device or to spatially disperse energy of the at least one first reference signal. This solution enables the influence of the second and third components of the radio channel to be mitigated when the location of the other device with respect to the controllable scatterer is known or unknown.

According to an implementation form of the second aspect, the device may be further configured to determine the first configuration of the plurality of controllable phase shifts based on minimizing a first utility function with respect to a plurality of candidate configurations of the plurality of controllable phase shifts. This solution enables a utility function based implementation for mitigating the influence of the second and third components of the radio channel.

According to an implementation form of the second aspect, the first utility function comprises $$\sum_{i=1}^{i=N_1} \left\| H_i^{FF} F(\phi) H_{NF} \right\|^2 \text{ or } \sum_{i=1}^{i=N_1} \left\| H_{NF} F(\phi) H_i^{FF} \right\|^2, \text{ wherein } H_i^{FF}$$

is an i-th member of a first codebook of $N_1$ channel matrices of the third component of the radio channel, $F(\phi)$ is one of the plurality of candidate configurations of the plurality of controllable phase shifts, and $H_{NF}$ is the estimate of the second component of the radio channel. This solution enables a low-complexity codebook-based implementation for mitigating the influence of the second and third components of the radio channel.

According to an implementation form of the second aspect, in the first configuration of the plurality of controllable phase shifts, the controllable scatterer may be configured to sequentially apply different combinations of the plurality of controllable phase shifts. This solution enables the mitigation of the influence of the second and third components of the radio channel over a number of sequential configurations, for example, when the location of the other device with respect to the controllable scatterer is unknown.

According to an implementation form of the second aspect, in a first configuration of the plurality of controllable phase shifts, the controllable scatterer may be configured to sequentially apply a first filter defined by a set of controllable phase shifts $F(\phi)$, and an opposite first filter defined by the set of controllable phase shifts $-F(\phi)$. This solution enables a low-complexity addition-based mitigation of the second and third components of the radio channel.

According to an implementation form of the second aspect, the controllable scatterer may be configured with a second configuration of the plurality of controllable phase shifts to enhance the propagation of the at least one second reference signal from the controllable scatterer to the other device. This solution enables the influence of the third component of the radio channel to be enhanced to improve the estimation of the third component of the radio channel.

According to an implementation form of the second aspect, the device may be further configured to transmit, to the controllable scatterer, at least one of: the first configuration of the plurality of controllable phase shifts for use during transmission of the at least one first reference signal, wherein the first configuration of the plurality of controllable phase shifts comprises one or more first sets of the controllable phase shifts, the second configuration of the plurality of controllable phase shifts for use during transmission of the at least one second reference signal, wherein the second configuration of the plurality of controllable phase shifts comprises one or more second sets of the controllable phase shifts, instructions to turn off the controllable scatterer for a first time period comprising transmission of the at least one first reference signal, instructions to apply the first configuration of the plurality of controllable phase shifts at the first time period, and instructions to apply the second configuration of the plurality of controllable phase shifts at a second time period comprising transmission of the at least one second reference signal. This solution enables a dynamic configuration of the controllable scatterer for estimating the components of the radio channel.

According to an implementation form of the second aspect, in the second configuration of the plurality of controllable phase shifts, the controllable scatterer may be configured to direct the at least one second reference signal towards the other device. This solution enables enhancing the influence of the third component of the radio channel.

According to an implementation form of the second aspect, the device may be further configured to determine the second configuration of the plurality of controllable phase shifts based on maximizing a second utility function with respect to a plurality of candidate configurations of the plurality of controllable phase shifts. This solution enables a utility function based implementation for enhancing the influence of the third component of the radio channel.

According to an implementation form of the second aspect, the second utility function comprises $$\sum_{i=1}^{i=N_2} \left\| H_i^{FF} F(\phi) H_{NF} \right\|^2 \text{ or } \sum_{i=1}^{i=N_2} \left\| H_{NF} F(\phi) H_i^{FF} \right\|^2, \text{ wherein } H_i^{FF}$$

is an i-th member of a second codebook of $N_2$ channel matrices of the third component of the radio channel, $F(\phi)$ is one of the plurality of candidate configurations of the plurality of controllable phase shifts, and $H_{NF}$ is the estimate of the second component of the radio channel. This solution enables a low-complexity codebook-based implementation for enhancing the influence of the third component of the radio channel.

According to an implementation form of the second aspect, the first codebook may be equal to the second codebook. This solution further reduces the complexity of mitigating the influence of the first component and enhancing the influence of the third component of the radio channel.

According to an implementation form of the second aspect, in the second configuration of the plurality of controllable phase shifts, the controllable scatterer may be configured to sequentially apply a second filter defined by a set of controllable phase shifts $F_2(\phi)$, and an opposite second filter defined by the set of controllable phase shifts $-F_2(\phi)$. This solution enables a low-complexity subtraction-based enhancement of the influence of the third component of the radio channel at the other device.

According to an implementation form of the second aspect, the device may be further configured to receive an estimate of the third component of the radio channel from the other device; and configure communication between the device and the other device based on the estimate of the third component of the radio channel. This solution enables the communication between devices to be optimized, for example, to increase throughput.

According to an implementation form of the second aspect, the device may be further configured to receive an estimate of a composite radio channel from the other device. This solution enables the device to estimate the third component of the radio channel, for example, in case of closed-loop communication or communication with transmitter-side information.

According to a third aspect, a method is provided for estimating a radio channel. The method may comprise the following steps performed by a device: receiving, from another device, at least one first reference signal for estimating the radio channel, wherein the radio channel comprises a first component between the other device and the device, a second component via a controllable scatterer, and a third component via the controllable scatterer, wherein the controllable scatterer comprises a plurality of reflective elements configured to alter a propagation of the at least one first reference signal from the controllable scatterer to the device; determining an estimate of the first component of the radio channel based on the at least one first reference signal; receiving at least one second reference signal, wherein the controllable scatterer is configured to alter a propagation of the at least one second reference signal from the controllable scatterer to the device; and determining an estimate of the third component of the radio channel based on the at least one second reference signal and an estimate of the second component of the radio channel. This solution enables a low-complexity implementation at the device to estimate components of the radio channel in presence of the controllable scatterer.

According to a fourth aspect, a method is provided for enabling estimation of a radio channel. The method may comprise the following steps performed by a device: transmitting, to another device, at least one first reference signal for estimating the radio channel, wherein the radio channel comprises a first component between the device and the other device, a second component via a controllable scatterer, and a third component via the controllable scatterer, wherein the controllable scatterer comprises a plurality of reflective elements configured to alter a propagation of the at least one first reference signal from the controllable scatterer to the other device; and transmitting at least one second reference signal, wherein the controllable scatterer is configured to alter a propagation of the at least one second reference signal from the controllable scatterer to the other device. This solution enables a low-complexity implementation at another device to estimate components of the radio channel in presence of the controllable scatterer.

According to a fifth aspect, a computer program is provided for estimating a radio channel. The computer program may comprise program code configured to cause performance of any implementation form of the method of the third aspect, when the computer program is executed on a computer.

According to a sixth aspect, a computer program is provided for enabling estimation of a radio channel. The computer program may comprise program code configured to cause performance of any implementation form of the method of the fourth aspect, when the computer program is executed on a computer.

Implementation forms of the disclosure can thus provide a device, a method, a computer program for estimating or enabling an estimation of radio channel components in presence of a controllable scatterer. These and other aspects of the disclosure will be apparent from the example embodiment(s) described below.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings:

FIG. 12 illustrates an example of a method for estimating a radio channel according to an embodiment; and FIG. 13 illustrates an example of a method for enabling estimation of a radio channel according to an embodiment.

Like references are used to designate like parts in the accompanying drawings.

DETAILED DESCRIPTION

Figures 1, 2:
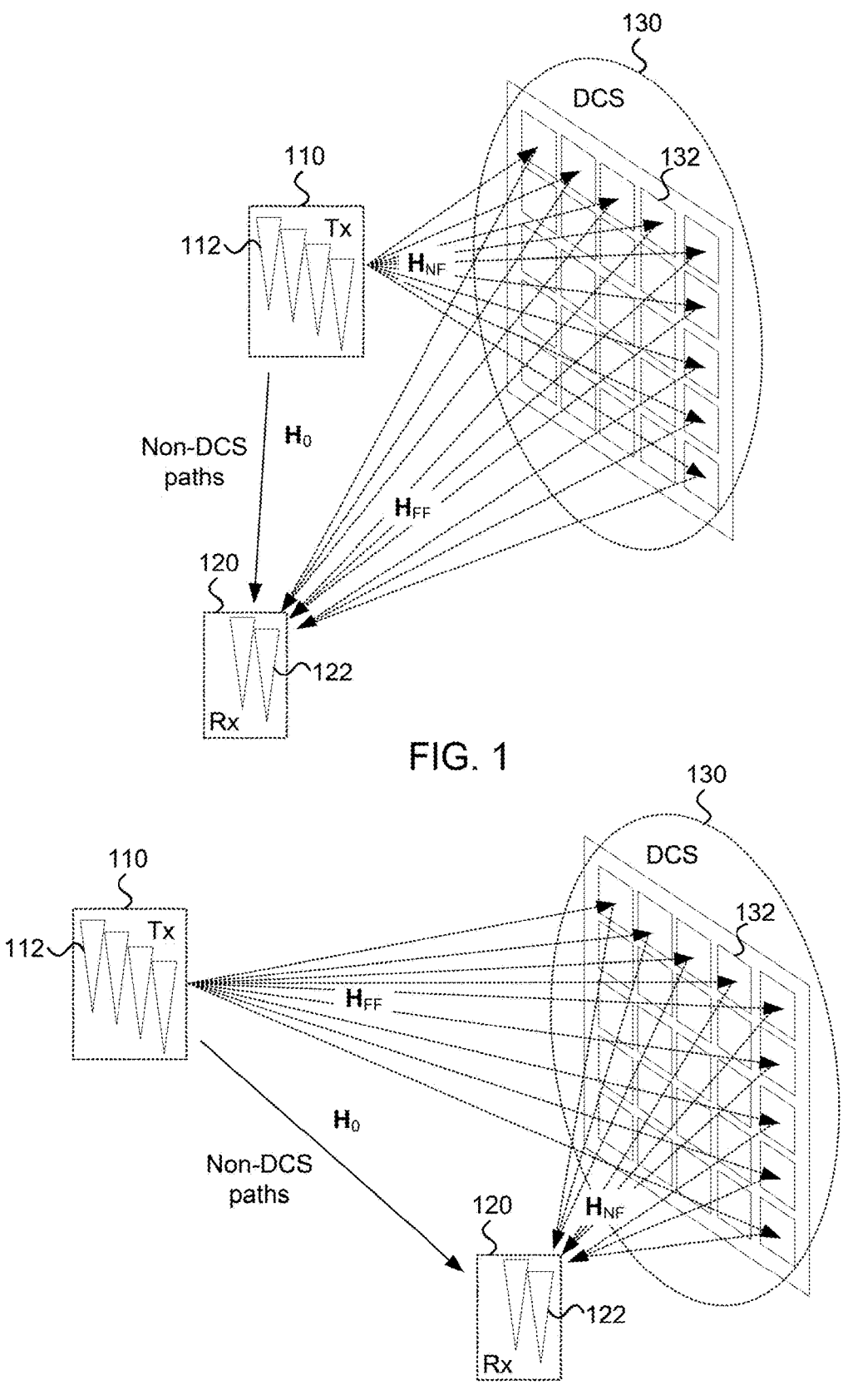
FIG. 1 illustrates an example of a radio channel with a controllable scatterer in a near field of a transmitter, according to an embodiment of the present disclosure.
FIG. 2 illustrates an example of a radio channel with a controllable scatterer in a near field of a receiver, according to an embodiment of the present disclosure.

Reference will now be made in detail to example embodiments, examples of which are illustrated in the accompanying drawings. The detailed description provided below in connection with the appended drawings is intended as a description of the present embodiments and is not intended to represent the only forms in which the present examples may be constructed or utilized. The description sets forth the functions of the examples and the sequence of operations for constructing and operating the examples. However, the same or equivalent functions and sequences may be accomplished by different examples.

A densification of antenna arrays may be applied to enhance data communication capabilities, for example, in cellular systems. Nevertheless, increasing the number of antennas in order to enhance coverage and user-centric service may be challenging. For example, every antenna of the antenna array may be accompanied with a radio frequency (RF) chain, which may increase cost, complexity, and energy consumption. Furthermore, increasing the number of antennas may also be inconvenient from deployment point of view, since more and more sites with antenna arrays may need to be deployed, for example, in urban environment.

Instead of increasing the number of antennas, the radio propagation channel may be manipulated with a digitally controllable scatterer (DCS) to adapt the radio channel to the environment and placement of transmitter and receiver devices. A DCS may comprise a number of reflective or scattering elements, for example, on a surface. A DCS may be implemented, for example, as reflective intelligent surfaces (RIS) or intelligent reflective surfaces (IRS). The reflection phase of each element in the surface may be independently controlled. This enables shaping the radio propagation channel to adapt it to different requirements and to the environment. Even though some embodiments have been described using a DCS as an example, it is understood that in some embodiments the controllable scatterer may be controlled by non-digital means, for example, by switching off the scatterer.

The knowledge of parameters of the radio channel may be exploited to optimize the phase shifts of the various surface elements. This, however, may be a complex task, since there may be a huge number of elements. Furthermore, the elements may not be active in the sense that they may not have RF chains. It may be therefore challenging to estimate all components of the radio channel. Embodiments of the present disclosure enable a low-complexity estimation of different components of a radio channel in presence of a controllable scatterer. Furthermore, the signal-to-noise ratio of channel estimation could be improved and the channel estimation may be performed faster.

According to an embodiment of the disclosure, reference signals may be transmitted for estimating a radio channel comprising a first component between two devices, and second and third components via a controllable scatterer. First reference signal(s) may be transmitted with the controllable scatterer configured to alter propagation of signals such that influence of the second and third components of the radio channel is mitigated. Second reference signal(s) may be transmitted with the controllable scatterer configured to enhance propagation of signals such that influence of the second and third components of the radio channel is increased. An estimate of the first component of the radio channel may be determined based on the at least one first reference signal and an estimate of the third component of the radio channel may be determined based on the second reference signal(s) and a pre-computed estimate of the second component of the radio channel.

FIG. 1 illustrates an example of a radio channel with a controllable scatterer in a near field of a transmitter according to an embodiment of the present disclosure. A DCS 130 is provided as an example of a controllable scatterer. The radio channel H between a transmitter (Tx) 110 and a receiver 120 (Rx) may comprise the following components:

1) Non-DCS path(s) $H_0$ between the transmitter 110 and the receiver 120: in some applications this component may be dominant in terms of energy since it may aggregate contributions of non-controllable scatterers and a line of sight (LOS) component, if the LOS component exists. $H_0$ may be time-variant, for example, because the transmitter 110 and/or the receiver 120 may be mobile. $H_0$ may comprise a first component of the radio channel.

2) DCS paths $H_{NF}$ and $H_{FF}$: Scattering due to the addition of the DCS 130 in the environment. The DCS 130 may be stationary with respect to the transmitter 110 and therefore the near-field channel $H_{NF}$ may be stable, i.e. not subject to significant variations over time. $H_{NF}$ may comprise a second component of the radio channel. In the example of FIG. 1, $H_{NF}$ is between the transmitter 110 and the DCS 130. Another channel component, the far-field channel $H_{FF}$, may be between the DCS 130 and the receiver 120. A location of the receiver 120 may change with respect to location of the DCS 130 and therefore $H_{FF}$ may be variable over time. $H_{FF}$ may comprise a third component of the radio channel. The DCS paths may be collectively referred to as $H_{DCS}$.

The radio channel between the DCS 130 and the receiver 120 may depend on controllable phase shifts $\phi$ and the resulting scattering pattern $F(\phi)$ (filter) introduced by the DCS elements 132. Selection of the phase shifts may however depend on the rest of the propagation channel, including the influence of the position of the receiver 120 with respect to the DCS 130, for example, the state of the far-field channel $H_{FF}$.

Aggregating these radio channel components, the radio channel H between the transmitter 110 and the receiver 120 may be represented as $$H = H_0 + H_{DCS} \tag{Eq. 1}$$

The radio channel H may also be called a composite radio channel, an aggregate radio channel, or an overall radio channel. Furthermore, by using $H_{NF}$ to denote the near-field (NF) channel matrix and $H_{FF}$ to denote the far-field (FF) channel matrix, $H_{DCS}$ and H may be written as follows. When the transmitter 110 is in the near field of the DCS 130 and the receiver 120 is in the far field of the DCS 130, the radio channel via the DCS 130, $H_{DCS}$, and the composite radio channel, H, may be expressed as and $$H_{DCS} = H_{FF}F(\phi)H_{NF} \tag{Eq. 2}$$

and $$H = H_0 + H_{FF}F(\phi)H_{NF}. \tag{Eq. 3}$$

FIG. 2 illustrates an example of a radio channel with a controllable scatterer in a near field of a receiver according to an embodiment of the present disclosure. In this example the far-field channel $H_{FF}$ is between the transmitter 110 and the DCS 130. The location of the transmitter 110 with respect to the DCS 130 may change. Hence, $H_{FF}$ may be a variable component. The near-field channel $H_{NF}$ is located between the DCS 130 and the receiver 120. The DCS 130 may be stationary with respect to the receiver 120. When the receiver 120 is in the near field of the DCS 130 and the transmitter 110 is in the far field of the DCS 130, as in the example of FIG. 2, the radio channel via the DCS 130, $H_{DCS}$, and the composite radio channel, H, may be expressed as and $$H_{DCS} = H_{NF}F(\phi)H_{FF} \tag{Eq. 4}$$

$$H = H_0 + H_{NF}F(\phi)H_{FF}. \tag{Eq. 5}$$

For a surface comprising S scattering elements the number of elements of both matrices $H_{NF}$ and $H_{FF}$ may be equal to $S \times N_{ant}$, where $N_{ant}$ is the number of Rx or Tx antennas. Depending on the application and deployment constraints, the value of S may range, for example, from the order of hundreds to thousands of elements. Due to the surface structure and the channel model resulting from the introduction of DCS 130, estimation of the intermediate channels $H_{NF}$ and $H_{FF}$ may be challenging. Knowledge of these channels may be exploited in the design of many algorithms in the communication chain, such as for example optimizing $F(\phi)$ for a given target (e.g. signal to noise ratio (SNR), channel rank), user scheduling and beam construction in a multiuser scenario, or estimating the overall end-to-end channel between any transmitter and receiver while communicating through the DCS 130.

The transmitter 110 may be a base station (BS), but it is possible that the transmitter 110 is another type of device, for example, a user equipment (UE). The receiver 120 may be a UE, but it is possible that the receiver 120 is another type of device, for example, a base station. Hence, the example embodiments may be applied for estimating the radio channel, for example, based on downlink or uplink training signals, as will be further discussed with reference to FIG. 7 to FIG. 9. Applying the example embodiments to both uplink and downlink may be beneficial since the uplink and downlink channels may not be reciprocal. A device may be also referred to as a node. A device located in the near field of the DCS 130, and therefore being directly associated with channel component $H_{NF}$ between the device and the DCS 130, may be referred to as a near-field node or a near-field static node. A device located in the far field of the DCS 130, and therefore being directly associated with channel component $H_{FF}$ between the device and the DCS 130, may be referred to as a far-field node.

The example embodiments of the present disclosure enable decomposition of the channel estimation process in several steps exploiting the different nature of the channel components $H_{NF}$, $H_{FF}$ and $H_0$. As a first step, part of the channel estimation process may be done offline, for example, before the time of the relevant data communication. This process may be done, for example, during the deployment phase in case of a DCS in the near field of a base station and refined later. The components depending on static or stable elements such as the $H_{NF}$ channel between the static DCS 130 and the near-field static node may be therefore predetermined and retrieved for use from a memory of the near-field node upon channel estimation. The DCS surface and the near-field node may be fixed, in order to gather information about $H_{NF}$, which may be estimated or computed offline, since it is related to a channel between near-field static nodes. Near field of an antenna may be defined based on the cross-section of the antenna, for example, the DCS, and it is directly related to the number of elements and the dimensions of the antenna and the communication frequency. The offline estimation process may be repeated, for example, whenever required by environmental conditions.

As a second step, estimation of the potential direct or non-DCS channel (i.e. not through the DCS 130) that may exist between the transmitter 110 and the receiver 120 may be performed. An estimate of this channel, denoted by $H_0$, may be obtained, for example, by exploiting prior knowledge of the radiation pattern of the DCS 130. Propagation through the DCS 130 may be altered to enable estimation of $H_0$. For example, propagation of signals may be altered such that influence of the second and third components is mitigated when estimating the composite radio channel. Various methods to alter propagation of the signal(s) to achieve this effect are disclosed. For example, energy collected by the DCS 130 may be diffused or directed towards a direction where the receiver 120 of the intended channel is not located (e.g. towards the transmitter 110, the sky, or the like). The energy scattered by the DCS 130 may also be spatially dispersed through a proper modulation of the DCS surface. Alternatively, the state of the DCS 130 may be altered such that different sequential sets of phase shifts cause the cascaded DCS channel to vanish during estimation of $H_0$ in the second step. This action may be performed via appropriate design of $F(\phi)$, which enables a low-complexity solution for the estimation of the additive non-DCS component of the channel $H_0$, as the cascaded channels through the DCS 130 diminish to 0 ($H_{DCS} \to 0$). In general, the second step may comprise a selection of the controllable phase shifts of the DCS 130 such that estimation of $H_0$ is enabled.

The far-field channel $H_{FF}$ may be estimated in a third step. Training signals may be first used to estimate the composite radio channel H, which may be characterized by $H = H_0 + H_{FF}F(\phi)H_{NF}$, when the transmitter 110 is in the near field of the DCS 130 and the receiver 120 is in the far field of the DCS 130, and by $H = H_0 + H_{NF}F(\phi)H_{FF}$ when the receiver 120 is in the near field and the transmitter 110 is in the far field. The far-field channel $H_{FF}$ may then be solved based on the acquired knowledge of the composite radio channel H and the earlier determined $H_{NF}$ and $H_0$, as will be further discussed below. In the third step, the filter defined by the surface phases $F(\phi)$ may be chosen along with the information about $H_{NF}$ to alter the propagation such that estimation of $H_{FF}$ is improved. The far-field channel $H_{FF}$ may be estimated "online", e.g. at the time of the relevant data communication, since it may be related to a channel involving at least one mobile node and therefore be time-variant.

The embodiments of the present disclosure may provide several advantages. For example, faster channel estimation is enabled since several parts of the estimation process may be done offline. These estimations may be then reused every time they are needed. They may be also easily updated in order to take into account the fast varying components or variations on a slower rate to incorporate major environmental variations. The disclosed approach also scales well to a large number of mobile nodes (e.g. mobile users, UEs) involved, since only the component from the DCS 130 to the relevant mobile node may be estimated or recomputed online. Furthermore, estimation of the various components of the channel ($H_0$, $H_{NF}$ and $H_{FF}$) is provided in addition to estimating the overall channel H. The example embodiments also make it easier to optimize the configuration of the DCS 130 (e.g. the values of $\phi$) to be used for energy focusing since the various components of the channel are available from the channel estimation procedure. The structure of the DCS 130 and the knowledge about its radiation patterns may be also taken into account in function of incident energy and phase shifts of the DCS elements 132 to provide a quick solution for estimating the channel.

Figure 3:
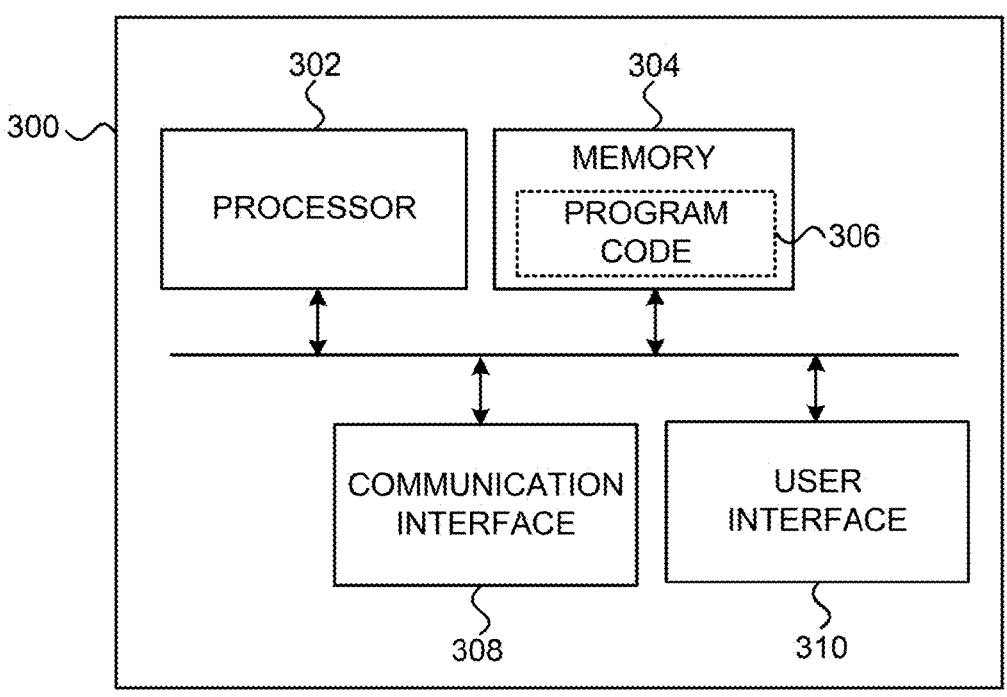
FIG. 3 illustrates an example of a device configured to practice one or more embodiments of the present disclosure.

FIG. 3 illustrates an example of a device configured to practice one or more embodiments of the present disclosure. A device 300 may comprise at least one processor 302. The at least one processor 302 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 300 may further comprise at least one memory 304. The at least one memory 304 may be configured to store, for example, computer program code or the like, for example, operating system software and application software. The at least one memory 304 may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM (read-only memory), PROM (programmable ROM), EPROM (erasable PROM), flash ROM, RAM (random access memory), etc.).

The device 300 may further comprise a communication interface 308 configured to enable the device 300 to transmit and/or receive information. The communication interface may be configured to provide at least one wireless radio connection, such as for example a 3GPP mobile broadband connection (e.g. 3G, 4G, 5G); a wireless local area network (WLAN) connection such as for example standardized by IEEE 802.11 series or Wi-Fi alliance; a short range wireless network connection such as for example a Bluetooth, NFC (near-field communication), or Radio-Frequency Identification (RFID) connection; a local wired connection such as for example a local area network (LAN) connection or a universal serial bus (USB) connection, or the like; or a wired Internet connection. The communication interface may comprise one or more antennas or antenna arrays for transmitting and/or receiving signals over an air interface.

The device 300 may further comprise a user interface 310 comprising at least one input device and/or at least one output device. The input device may take various forms such a keyboard, a touch screen, or one or more embedded control buttons. The output device may, for example, comprise a display, a speaker, a vibration motor, or the like. The user interface 310 may be controlled by another device in the network.

When the device 300 is configured to implement some functionality, some component and/or components of the device, such as for example the at least one processor 302 and/or the at least one memory 304, may be configured to implement this functionality. Furthermore, when the at least one processor 302 is configured to implement some functionality, this functionality may be implemented using program code 306 comprised, for example, in the at least one memory 304.

The functionality described herein may be performed, at least in part, by one or more computer program product components such as software components. According to an embodiment, the device comprises a processor or processor circuitry, such as for example a microcontroller, configured by the program code when executed to execute the embodiments of the operations and functionality described herein. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), graphics processing units (GPUs), or the like.

The device 300 may be configured to perform method(s) described herein or may comprise means for performing method(s) described herein. In one example, the means may comprise the at least one processor 302, the at least one memory 304 including program code configured to, when executed by the at least one processor 302, cause the device to perform the method.

The device 300 may comprise, for example, a computing device such as for example a modulator chip, a demodulator chip, a baseband chip, a mobile phone, a tablet, a laptop, an internet-of-things device, a base station, or the like. Examples of IoT devices include, but are not limited to, consumer electronics, wearables, sensors, and smart home appliances. Although the device 300 is illustrated as a single device it is appreciated that, wherever applicable, functions of the device 300 may be distributed to a plurality of devices, for example, between components of a transmitter, a receiver, or a transceiver.

Figure 4:
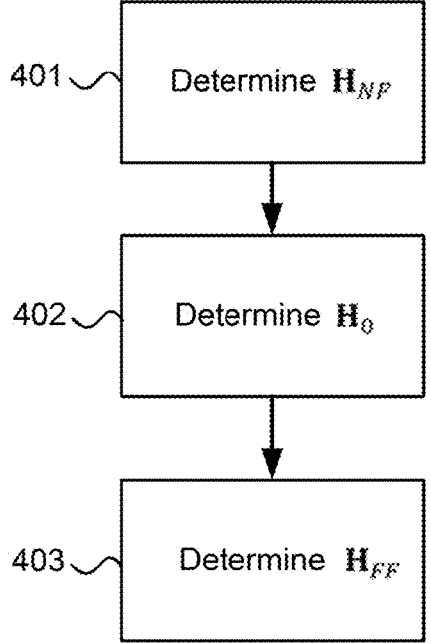
FIG. 4 illustrates an example of an algorithm for estimating a radio channel in presence of a controllable scatterer, according to an embodiment of the present disclosure.

FIG. 4 illustrates an example of an algorithm for estimating a radio channel in presence of a digitally controllable scatterer according to an embodiment of the present disclosure. One or more of the operations 401 to 403 may be performed by the transmitter 110, the receiver 120 or the DCS 130, or any other entity involved in the channel estimation request, collection, processing, or procedure.

At operation 401, an estimate of the near-field channel, $H_{NF}$, may be determined. Given that the DCS 130 and the near-field node may be fixed in space and in the near field, the main components of $H_{NF}$ may be dependent on their relative positions and the propagation path (presence of reflectors). $H_{NF}$ may be therefore pre-computed, for example, based on raytracing tools, or estimated through a measurement campaign, or based on a combination of both of these approaches. Determining $H_{NF}$ may therefore comprise retrieving a predetermined $H_{NF}$ from a memory. Information of the near-field channel $H_{NF}$ may be exchanged between the transmitter 110, the receiver 120 and/or the DCS 130, as will be further described below. The estimate of $H_{NF}$ may be recomputed anytime during the operation of the device, for example, if the environment changes.

An objective of operation 401 is the acquisition of the knowledge about the near-field channel $H_{NF}$ connecting the two fixed elements, the DCS 130 and the static near field node that are stationary with respect to each other. As described above, depending on roles of the transmitter 110 and the receiver 120 as either the near-field static node or the far-field node, the composite radio channel may be characterized by different expressions. When the transmitter 110 is the near-field node, the composite radio channel may be expressed as $$H = H_0 + H_{FF}F(\phi)H_{NF}$$

and when the Rx is the near field node, the composite radio channel may be expressed as $$H = H_0 + H_{NF}F(\phi)H_{FF}.$$

According to an embodiment, channel estimation may be performed when there are line-of-sight (LOS) conditions between the DCS 130 and the near-field node. LOS terms may be dominant with respect to multipath contribution, if present. Furthermore, the following information is assumed to be available, for example, preconfigured manually at the time of installation: location $$l_a^{NF}$$

for each antenna a of the static near-field node, and location $$l_s^{DCS}$$

of each DCS element s. An objective may be to compute the propagation channel based on a propagation model taking into account the propagation environment. Since LOS conditions are considered in this embodiment, the process of determining the near-field channel $H_{NF}$ may comprise computing distance $$d_{a,s}^{NF} = \left\| l_a^{NF} - l_s^{DCS} \right\| \qquad \text{(Eq. 6)}$$

between each antenna a and each DCS element s, and calculating the near-field channel using an interpolation function taking into account patterns $$h_{a,s}^{NF} = p(\lambda_c, l_a^{NF}, l_s^{DCS}),$$

where p is a pattern function. Assuming an isotropic pattern approximation, the channel may be computed by $$h_{a,s}^{NF} = \sqrt{\frac{\lambda_c}{4\pi}} \frac{1}{d_{a,s}} e^{-\frac{j2\pi d_{a,s}}{\lambda_c}} \qquad \text{(Eq. 7)}$$

between each antenna a and each DCS element s.

If the near-field node is operating as the transmitter 110 with N transmitter antennas, the near-field channel may be determined as $$H_{NF} = \begin{bmatrix} h_{1,1}^{NF} & \cdots & h_{N,1}^{NF} \\ \vdots & \ddots & \vdots \\ h_{1,S}^{NF} & \cdots & h_{N,S}^{NF} \end{bmatrix}. \qquad \text{(Eq. 8)}$$

In this case $H_{NF}$ represents the S×N channel matrix between the N transmitter antennas and the S unit elements of the DCS 130.

If the near-field node is operating as the receiver 120 with M receiver antennas, the near-field channel may be determined as $$H_{NF} = \begin{bmatrix} h_{1,1}^{NF} & \cdots & h_{1,S}^{NF} \\ \vdots & \ddots & \vdots \\ h_{M,1}^{NF} & \cdots & h_{M,S}^{NF} \end{bmatrix}. \qquad \text{(Eq. 9)}$$

In this case $H_{NF}$ represents the M×S channel between the S unit element of the DCS 130 and the M receiver antennas. The estimate of the near-field channel $H_{NF}$ may be therefore determined based on distances between antenna(s) of the near-field node and the reflective elements 132 of the DSC 130. This example may be also extended to a more complex scenario, where in addition to the LOS components there is a richer scattering environment. In that case, $H_{NF}$ may be determined, for example, based on ray tracing computations to take into account any non-LOS components.

According to an example embodiment, an estimate of the near-field channel $H_{NF}$ may be determined by collecting information of the near-field channel $H_{NF}$ by a measurement campaign comprising at least one of: point-to-point measurement at the deployment phase, common component extraction over a set of measurements, or averaging over multiple measurements with various values of $\phi$ or multiple served communicating nodes. These measurements may also be used in order to update and/or refine the computed channel matrix $H_{NF}$, for example, through a background process after deployment.

At operation 402, an estimate of the non-DCS channel $H_0$, comprising direct LOS and/or non-LOS path(s) from the transmitter 110 to the receiver 120 may be determined. In this operation, the propagation through the DCS 130 may be altered such that estimation of the non-DCS channel $H_0$ is enabled. Estimating the non-DCS channel $H_0$ may comprise, for example, choosing the controllable phase shifts of the DCS 130 for maximum scattering based on knowledge of $H_{NF}$ and estimating the channel $H_0$ when the impact of the DCS 130 is diminished. This enables isolating the contribution of the DCS paths when estimating the composite radio channel H. A signal used for channel estimation during the operation 402, for example, a training signal or a pilot signal, may comprise a first reference signal. However, multiple (first) reference signals may be applied in some embodiments of the operation 402. A configuration of the controllable phase shifts $\phi$ of the DCS 130 used at the operation 402 may comprise a first configuration of the controllable phase shifts. The first configuration may comprise multiple sets of controllable phase shifts.

Figure 5:
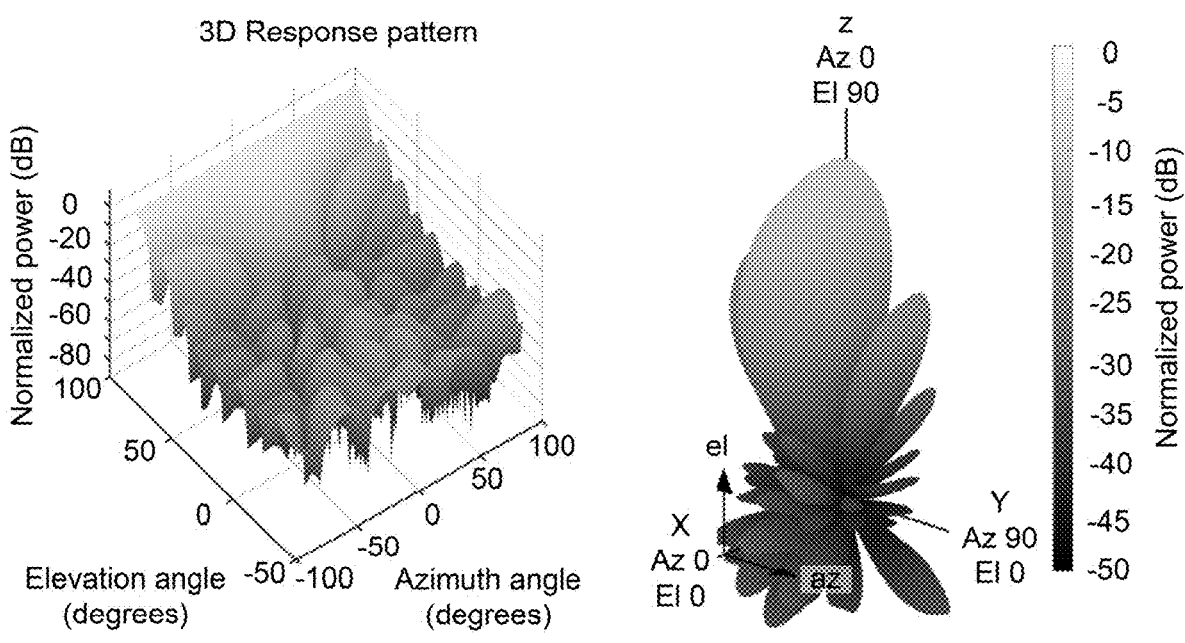
FIG. 5 illustrates an example of a radiation pattern of a digitally controllable scatterer pointing towards direction z, according to an embodiment of the present disclosure.

FIG. 5 illustrates an example of a radiation pattern of a digitally controllable scatterer pointing towards direction z according to an embodiment of the present disclosure. According to an example embodiment, the DSC 130 may be configured with a first configuration of the controllable phase shifts to direct signals away from the receiver 120 during estimation of $H_0$. It is noted that the DCS 130 may direct away only electromagnetic radiation received by it and therefore configuration of the DCS 130 may not affect direct propagation (LOS or non-LOS) between the transmitter 110 and the receiver 120. Channel estimation may be based on first reference signal(s) transmitted by transmitter 110, when the DCS 130 is configured with the first configuration of the controllable phase shifts. The receiver 120 may estimate a radio channel by comparing this known reference information to the corresponding received signal(s). However, this approach may not provide isolation between the different channel components as such. Therefore, at the operation 402 the propagation of signals from the DCS 130 to the receiver 120 may be altered, for example, restricted by directing them away from the receiver 120, as illustrated in FIG. 5, in order to eliminate or diminish the contribution of the propagation path(s) via the DCS 130.

In general, altering the propagation at operation 402 may comprise configuring the phase shifts $\phi$ of the DCS 130 such that effect of the DCS paths on the channel estimation at receiver 120 is reduced. The propagation may be, for example, sequentially altered with different sets of phase shifts to eliminate the effect of the DCS paths. Such altering may or may not change received signal strength of the first reference signal(s) at the receiver 120. Another example of altering the propagation is to restrict the propagation from the DCS 130 to the receiver 120. Restricting the propagation may comprise setting the DCS 130 to a configuration, where propagation from the DCS 130 to the receiver 120 is weakened, when compared to another configuration of the DCS 130. Restriction of the propagation may therefore cause the received signal strength via the DCS paths to decrease at the receiver 120, when compared to another configuration of the DCS 130.

To retrieve the direct path of the channel (i.e. the non-DCS channel) $H_0$, the receiver 120 may estimate the channel when the contribution of the DCS 130 is eliminated or diminished. Because $H=H_0+H_{DCS}$ it may be desired to make the contribution of $H_{DCS}$ much smaller than the contribution of $H_0$, when estimating $H_0$. On the other hand, as discussed above the DCS part of the channel $H_{DCS}$ may be modeled as $H_{DCS}=H_{FF}F(\phi)H_{NF}$, when the transmitter 110 is the near-field node. And, when the receiver 120 is the near-field node, the DCS channel may be modeled as $H_{DCS}=H_{NF}F(\phi)H_{FF}$. To eliminate the effect of the DCS 130, the filter $F(\phi)$ corresponding to the first configuration of the controllable phase shifts, may be in general selected such that $H_{DCS}\rightarrow 0$.

This may be done based on prior knowledge of the response of the DCS 130. Knowing the properties of the DCS 130, for example, the number of its elements 132, their positions and the radiation pattern of an element, it is possible to compute the transfer function (filter) $F(\phi)=f(\Theta_i, \Phi_i, \theta_d, \Phi_d, \phi)$, where $(\Theta_i, \Phi_i)$ are incidence elevation and azimuth angles and $(\theta_d, \Phi_d)$ are departure elevation and azimuth angles. Based on the operation 401, prior knowledge of the near-field channel $H_{NF}$ is available and thus either incident angles $(\Theta_i, \Phi_i)$, if the transmitter 110 is the near-field node, or departure angles $(\theta_d, \Phi_d)$, if the receiver 120 is the near-field node, are known. The selection of $F(\phi)$ may be performed, for example, through precomputed tables, charts, radiation patterns, or closed-form or semi-analytical expressions.

Exploiting the available information about the incident angles and knowing a target direction towards the receiver, the configuration of the set of phase shifts $\phi$ may be selected such that the DSC channel $H_{DCS}$ is minimized. The selected target direction where the energy is to be focused may be in the null space of the communication space. In one example, when the target direction of the receiver 120 is unknown, the DCS 130 may be configured to direct signals received from the transmitter 110 towards axis z (azimuth angle 0°, elevation angle 90°), e.g. towards the sky, as illustrated in FIG. 5. Under these conditions, the perceived channel $H=H_0+H_{DCS}$ may be approximated as $H=H_0$ and therefore any suitable channel estimation method, for example, based on using training signal(s) (pilots), may be used to estimate H and hence $H_0$.

Figure 6:
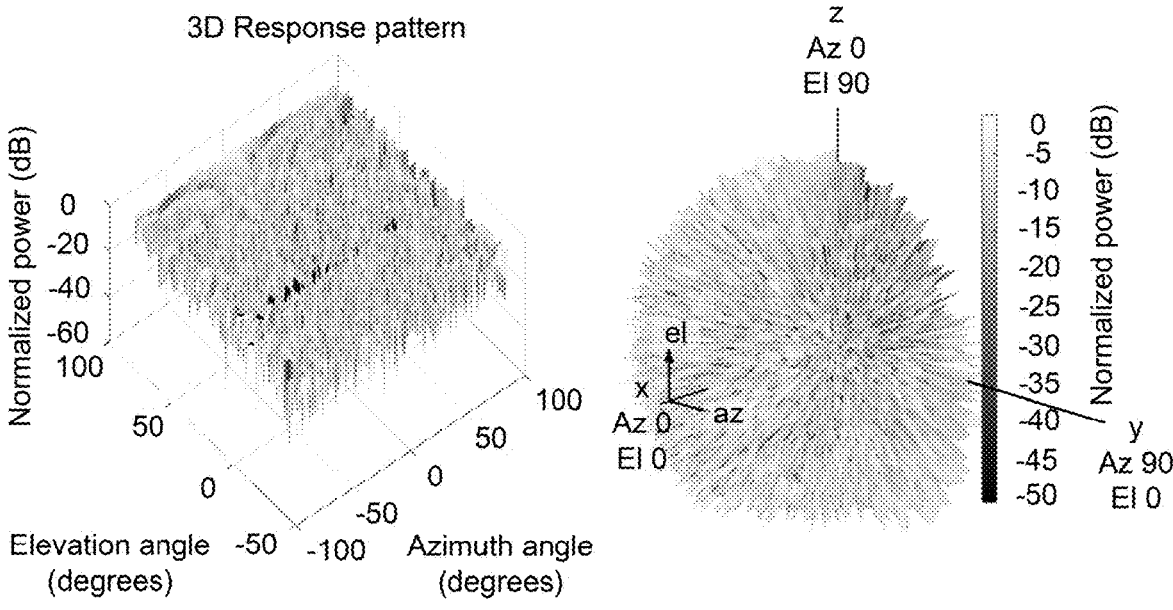
FIG. 6 illustrates an example of a radiation pattern of a digitally controllable scatterer with spatially dispersed scattered energy, according to an embodiment of the present disclosure.

FIG. 6 illustrates an example of a radiation pattern of a digitally controllable scatterer with spatially dispersed scattered energy, according to an embodiment of the present disclosure. During the operation 402, the DCS 130 may be configured to spatially disperse or diffuse energy of signals received from the transmitter 110. It is noted that the DCS 130 may disperse only electromagnetic radiation received by it and therefore configuration of the DCS 130 may not affect the direct propagation (LOS or non-LOS) between the transmitter 110 and the receiver 120. The dispersion of the energy provides another embodiment for altering or restricting propagation of signals from the DCS 130 to the receiver 120. In this embodiment, the same constraints may apply as in the embodiment of FIG. 5. However, information about the incident angles and hence the channel $H_{NF}$ is not needed, because the contribution of the DCS 130 may be neglected if the scattered energy on the communication subspace remains low enough (e.g. at the noise level). Therefore, an objective may be to disperse the incident energy in all directions in a substantially uniform manner. Based on the transfer function $F(\phi)=f(\Theta_i, \Phi_i, \Theta_d, \Phi_d, \phi)$, the first configuration of the controllable phase shifts may be selected such that for a wide range of incident angles a sufficiently dispersive effect (e.g. scattering substantially uniformly in all directions) is provided, as depicted in FIG. 6.

Under these conditions, the perceived channel $H=H_0+H_{DCS}$ may be approximated as $H=H_0$. Thus, any channel estimation method may be used to estimate H and hence $H_0$. Advantages of this embodiment include relaxing the requirements on the input parameters. For example, less information about the incident angles and the DCS radiation patterns may be needed.

According to an embodiment, a hardware capability of the DCS 130 may be turned off at the operation 402. The DCS 130 may be turned off during transmission of the first reference signal(s), in order to restrict propagation of signals from the DCS 130 to the receiver. For example, when the DCS 130 is turned off, it may not direct signals originating from the transmitter 110 towards the receiver 120. Since scattering properties of the DCS elements 132 are turned off, the impact of the DCS 130 may be eliminated and its contribution to the radio channel may be considered negligible. For example, when a DCS element is turned off, it does not scatter the impinging signal. And, when a DCS element is turned off, the energy received via the DCS paths may be small enough to be neglected. Turning off the DCS 130 may therefore cause propagation of signals from the DCS 130 to the receiver 120 to be restricted, because the propagation of the signals is restricted when compared to a situation where the DCS 130 is turned on and configured to enhance propagation of the signals toward the receiver 120.

Exploiting this capability enables the DCS component of the channel $H_{DCS}$ to be eliminated by turning off the DCS 130. Any suitable channel estimation techniques based on training signals (e.g. pilots) may be then used to estimate $H=H_0$. The transmitter 110 or the receiver 120 may transmit instructions to the DCS 130 to turn off the DCS 130. The instructions may indicate a time period for turning off the DCS 130. The time period may comprise transmission of the first reference signal(s) for estimating $H_0$. Turning off may in general comprise disabling the DCS 130.

According to an example embodiment, the first configuration of the phase shifts for the operation 402 may be determined based on a codebook of channel matrices. An objective may be again to eliminate or mitigate the effect of $H_{DCS}$ to enable estimation of $H_0$. This may be achieved through a proper selection of $F(\phi)$, i.e. the selection of the controllable phases shifts $\phi$ for the elements of the DCS 130. The near-field channel $H_{NF}$ is known, for example, based on operation 401. A codebook of $N_1$ matrices $$\mathcal{H} = \{H_1^{FF}, H_2^{FF}, \dots, H_{N_1}^{FF}\}$$

may be constructed. This codebook may be referred to as a first codebook. The matrices of the codebook may be adapted to the situation as they represent a discretization or a quantized version of potential subspaces of possible $H_{FF}$. Therefore, the size of these matrices may be $S\times N$, if the far-field node acts as the transmitter 110 with N transmit antennas, and $M\times S$, if the far-field node acts as the receiver 120 with M receive antennas, where S is the number of elements on the DCS 130. The set of matrices of the codebook may be constructed offline, updated online, or learned through any suitable learning method that can be used online.

Based on the codebook $$\mathcal{H} = \{H_1^{FF}, H_2^{FF}, \dots, H_{N_1}^{FF}\},$$

the selection of the controllable phase shifts may be done, for example, by solving the following optimization problem:

$$F_{opt}(\phi) = \underset{F(\phi)}{\arg\min} U_{Step1}(F(\phi), \mathcal{H}, H_{NF}). \qquad \text{(Eq. 10)}$$

where $U_{Step1}$ is a utility function. If the transmitter 110 is in the near field of the DCS 130, the utility function may comprise $$U_{Step1}(F(\phi), \mathcal{H}, H_{NF}) = \sum_{i=1}^{i=N_1} \left\| H_i^{FF} F(\phi) H_{NF} \right\|. \qquad \text{(Eq. 11)}$$

If the receiver 120 is in the near field of the DCS 130, the utility function may comprise $$U_{Step1}(F(\phi), \mathcal{H}, H_{NF}) = \sum_{i=1}^{i=N_1} \left\| H_{NF} F(\phi) H_i^{FF} \right\|. \qquad \text{(Eq. 12)}$$

Alternatively, a squared norm may be used in Eq. 11 or Eq. 12. The first configuration of the controllable phase shifts may be therefore determined based on a utility function with respect to candidate configurations of the controllable phase shifts. The utility function may be minimized to determine the first configuration of the phase shifts. The utility function $U_{step1}$ may be referred to as a first utility function and it may comprise or be based on Eq. 11 or Eq. 12. The obtained filter $F_{opt}(\phi)$ may result in low energy through the DCS channel $H_{DCS}$ such that the channel $H = H_0 + H_{DCS}$ perceived at the operation 402 may be approximated as $H = H_0$. Therefore, any suitable channel estimation method may be applied to the first reference signal(s) to estimate H and hence $H_0$.

In the above embodiments of the operation 402, the channel estimation may be done, for example, based on turning off the DCS elements or by properly choosing the phases $\phi$ at the level of the DCS 130. It is, however, possible that the first configuration of the controllable phase shifts comprises multiple sets or combinations of the controllable phase shifts that are applied sequentially during transmission of the first reference signal(s). Therefore, different observations H[k] of the radio channel may be expressed as $H[k] = H_0 + H_{DCS}[k]$, where k is a time index and $H_{DCS}[k]$ depends on the choice of phases $F(\phi)[k]$ applied at time k. The non-DCS channel $H_0$ may be assumed to be stable over the estimation period, which may be within the coherence time of the channel. Due to a large number of observations, the sum of the DCS term $(1/K)\Sigma_k H_{DCS}[k]$ may be configured to converge to a constant known matrix $G_{DCS}$.

$$\frac{1}{K} \sum_k H_{DCS}[k] \xrightarrow{K \to \infty} G_{DCS} \qquad \text{(Eq. 13)}$$

Matrix $G_{DCS}$ may be, for example, a zero matrix or an identity matrix.

Estimation of $H_0$ may comprise observing the channel over K consecutive channel realizations by any suitable channel sounding techniques (training using training signals, pilots, or the like), and selecting at each time slot $k \in [1, \dots, K]$, a different phase matrix to accelerate the convergence to a given $G_{DCS}$. The estimation of $H_0$ may be computed as $$H_0 = \frac{1}{K} \sum_k \hat{H}[k] - G_{DCS} \qquad \text{(Eq. 14)}$$

Alternatively, $H_0$ may be computed by minimizing a utility function $U(\{\hat{H}[k]\}_{k=1 \dots K}, G_{DCS})$ that is, $H_0 = \arg\min U(\{\hat{H}[k]\}_{k=1 \dots K}, G_{DCS})$. Therefore, determining the estimate of $H_0$ may be based on multiple observations corresponding to different combinations of the controllable phase shifts. $\hat{H}[k]$ may comprise an estimate of the realization of channel H at a time slot k.

According to an embodiment, at the operation 402, in the first configuration of the controllable phase shifts, a filter defined by the set of controllable phase shifts $F(\phi)$ may be used at a first time slot or time period. An opposite filter $-F(\phi)$ may be used at a second time slot or time period. The two filters may be, for example, applied at consecutive time slots. Filter $F(\phi)$ and the opposite filter $-F(\phi)$ may be therefore applied sequentially. This enables propagation of the first reference signal(s) to be altered such that influence of the DCS paths is mitigated over a sequence of time slots. In this embodiment, the strength of the DCS paths may or may not change. The first configuration may also indicate the time slots or periods for applying each filter. Applying opposite filters sequentially enables to eliminate or mitigate the DCS channel to estimate $H_0$. When estimating $H_0$, the receiver 120 may, for example, add observations of the composite radio channel corresponding to the filter $F(\phi)$ and the opposite filter $-F(\phi)$. This may be applied, for example, if the attached loads allow to realize $\phi + \pi[2\pi]$. This may depend on the range of loads that are attached, and therefore a certain space of the phase profiles may be used.

Referring back to FIG. 4, at the operation 403 an estimate of the far-field channel $H_{FF}$ may be determined. A signal used for channel estimation during the operation 403, for example, a training signal or a pilot signal, may comprise a second reference signal. A second configuration of the controllable phase shifts of the DCS elements 132 may be selected in order to generate reflected energy through scattering based on knowledge of $H_{NF}$. In the second configuration, the DCS 130 may be configured to enhance propagation of signals from the DCS 130 to the receiver 120. For example, second reference signal(s) received from the transmitter 110 may be directed towards the receiver 120. The second configuration of the phase shifts may therefore enhance, i.e. strengthen, propagation of signals from the DCS 130 to the receiver 120, for example, compared to the first configuration of the DCS 130 of operation 402. The receiver 120 may estimate the composite radio channel H based on the second reference signal(s) transmitted when the DCS 130 is in the second configuration. The estimate of the far-field channel $H_{FF}$ may be then determined based on the estimate of the composite radio channel H and the estimate of the non-DCS channel $H_0$ determined at the operation 402. The estimate of the far-field channel $H_{FF}$ may be therefore determined based on the second reference signal(s) and the estimate of $H_0$. The estimate of the third component may also be determined based on the knowledge of $H_{NF}$.

According to an embodiment, the second configuration of the plurality of controllable phase shifts may be determined based on maximizing a utility function with respect to a plurality of candidate configurations of the plurality of controllable phase shifts. At the operation 402, the estimate of $H_0$ is already available based on the operation 402 and $H_{NF}$ is available based on the operation 401. Therefore, the combined channel through the DCS 130 $H_{DCS}=H-H_0$ may be determined after estimating the composite channel H. An objective here may be to characterize the components of $H_{DCS}$, thus perform the estimation of the remaining component of the propagation channel, i.e. the far-field channel $H_{FF}$ between the DCS 130 and the receiver 120.

A codebook $$\mathcal{H} = \{H_1^{FF}, H_2^{FF}, \dots , H_{N_2}^{FF}\}$$

of a discretization or a quantized version of potential subspaces of possible $H_{FF}$ may be used. This codebook may be referred to as a second codebook and it may comprise $N_2$ matrices. The second codebook may or may not be equal to the first codebook of the operation 402. Therefore, $N_1$ may or may not be equal to $N_2$. However, same structural constraints may still hold and therefore the size of the matrices may be S×N or M×S, as described above. Also the second codebook may be constructed offline, it may be static or updated through an online process, or constructed online through a learning process.

Based on the second codebook the controllable phase shifts to be used for the estimation of H and $H_{FF}$ may be selected, for example, by solving the following optimization problem:

$$F_2(\phi) = \arg\max_{F(\phi)} U_{Step2Train}(F(\phi), \mathcal{H}, H_{NF}), \qquad \text{(Eq. 15)}$$

where $U_{Step2Train}$ is a second utility function. If the transmitter 110 is in the near field of the DCS 130, the second utility function may comprise $$U_{Step2Train}(F(\phi), \mathcal{H}, H_{NF}) = \sum_{i=1}^{i=N_2} \left\| H_i^{FF} F(\phi) H_{NF} \right\|. \qquad \text{(Eq. 16)}$$

If the receiver 120 is in the near-field of the DCS 130, the second utility function may comprise $$U_{Step2Train}(F(\phi), \mathcal{H}, H_{NF}) = \sum_{i=1}^{i=N_2} \left\| H_{NF} F(\phi) H_i^{FF} \right\|. \qquad \text{(Eq. 17)}$$

Alternatively, a squared norm may be used in Eq. 16 or Eq. 17. Using the filter $F_2(\phi)$ obtained based on solving Eq. 15, any suitable channel estimation process based on reference signal(s), for example, training sequences such as pilots, may be performed in order to estimate the composite radio channel H. Since $H_0$ is known from the operation 402, an estimate of $H_{DCS}$ may be obtained as a function of H and $H_0$, $H_{DCS}=f(H,H_0)$, for example, by computing $H_{DCS}=H-H_0$, or by any other utility function based technique. An estimate of the far-field channel $H_{FF}$ may be determined, for example, by solving the following optimization problem:

$$H_{FF} = \arg\min_{H_{FF}} U_{Step2ChEst}(F_2(\phi), H_{NF}, H_{DCS}, H_{FF}), \qquad \text{(Eq. 18)}$$

where $U_{Step2ChEst}$ is a third utility function. If the transmitter 110 is in the near-field of the DCS 130, the third utility function may comprise $$U_{Step2ChEst}(F_2(\phi), H_{NF}, H_{DCS}, H_{FF}) = \| H_{DCS}-H_{FF}F_2(\phi) \\ H_{NF} \|. \qquad \text{(Eq. 19)}$$

If the receiver 120 is in the near-field of the DCS 130, the third utility function may comprise $$U_{Step2ChEst}(F_2(\phi), H_{NF}, H_{DCS}, H_{FF}) = \| H_{DCS}-H_{NF} \\ F_2(\phi)H_{FF} \|. \qquad \text{(Eq. 20)}$$

An estimate of $H_{FF}$ may be therefore determined based on minimizing the third utility function with respect to multiple candidate estimates of $H_{FF}$. Substituting $H_{DCS}=H-H_0$, the third utility function may be written as $\|H-H_0-H_{FF}F_2(\phi) H_{NF}\|$ or $\|H-H_0-H_{NF}F_2(\phi)H_{FF}\|$, when the transmitter 110 or the receiver 120 is in the near-field of the DCS 130, respectively.

According to an embodiment, the set of candidate estimates of $H_{FF}$ may be equal to the second codebook $$\mathcal{H} = \{H_1^{FF}, H_2^{FF}, \dots , H_{N_2}^{FF}\}$$

of channel matrices. This embodiment enables simplification of the optimization problem of Eq. 18, since the amount of candidate matrices is reduced. Restricting the space of possible $H_{FF}$ to the set defined by the second codebook, the optimization problem of Eq. 18 becomes $$H_{FF} = \arg\min_{H_i^{FF} \in \mathcal{H}} U_{Step2ChEst}(F_2(\phi), H_{NF}, H_{DCS}, H_i^{FF}) \qquad \text{(Eq. 21)}$$

If the transmitter 110 is in the near-field of the DCS 130, the third utility function may comprise $$\qquad \text{(Eq. 22)}$$

$$U_{step2ChEst}(F_2(\phi), H_{NF}, H_{DCS}, H_i^{FF}) = \left\| H_{DCS} - H_i^{FF}F_2(\phi)H_{NF} \right\|.$$

If the receiver 120 is in the near-field of the DCS 130, the third utility function may comprise $$\qquad \text{(Eq. 23)}$$

$$U_{step2ChEst}(F_2(\phi), H_{NF}, H_{DCS}, H_i^{FF}) = \left\| H_{DCS} - H_{NF}F_2(\phi)H_i^{FF} \right\|.$$

According to an embodiment, at the operation 403, in the second configuration of the controllable phase shifts, a filter defined by a set of controllable phase shifts $F_2(\phi)$ may be used at a first time slot or time period. An opposite filter $-F_2(\phi)$ may be used at a second time slot or time period. The two filters may be, for example, applied at consecutive time slots. Filter $F_2(\phi)$ and the opposite filter $-F_2(\phi)$ may be therefore applied sequentially. The propagation of the second reference signal(s) may be therefore enhanced such that influence of $H_0$ is mitigated over a sequence of time slots and the influence of the DCS paths is enhanced over the sequence of time slots. In this embodiment, the strength of the DCS paths may or may not change, when considering the signals corresponding to the two filters individually. The second configuration may also indicate the time slots or periods for applying each filter. At the operation 403, applying opposite filters sequentially enables to eliminate or mitigate influence of $H_0$ when estimating $H_{FF}$. When determining $H_{FF}$ the receiver 120 may, for example, subtract observations of the composite radio channel corresponding to the filter $F_2(\phi)$ and the opposite filter $-F_2(\phi)$.

According to an embodiment, determining the estimate of $H_{FF}$ may comprise determining multiple estimates of the composite radio channel H based on multiple (second) reference signals and determining the estimate of $H_{FF}$ based on the estimates of the composite radio channel. This embodiment may apply the second codebook $$\mathcal{H} = \{H_1^F, H_2^{FF}, \dots, H_{N_2}^{FF}\},$$

which may or may not be equal to the first codebook of the operation 402. In the above embodiments of the operation 403, the channel estimation may be performed, that is, by selecting one $F_2(\phi)$ and using it for estimation of H. It is, however, possible to estimate the composite channel H multiple times, for example, based on multiple instances of (second) reference signals. The estimate obtained at time index k is $H[k]=H_0+H_{DCS}[k]$, where $H_{DCS}[k]$ depends on the choice of $F(\phi)[k]$ applied at time k. The non-DCS channel $H_0$ may be assumed to be stable over the estimation period. The selection of $F(\phi)$ and the estimation of $H_{FF}$ can be therefore jointly done through the optimization procedure, e.g. based on the second codebook of channel matrices. $H_{FF}$ and $F(\phi)$ may then be solved after multiple observations $k=1, \dots, K$ of $H_{DCS}[k]$, for example, by solving the following optimization problem:

$$H_{FF}, F_2(\phi) = \arg\max_{H_i^{FF} \in \mathcal{H}, \{F(\phi)\}} \|f(\{H_{DCS}[k]\}_{k \in 1 \dots K})\|. \tag{Eq. 24}$$

where $$H_{DCS}[k] = H[k] - H_0 \cdot H_i^{FF}$$

is an i-th member of a the second codebook $$\mathcal{H} = \{H_1^{FF}, H_2^{FF}, \dots, H_{N_2}^{FF}\}$$

of channel matrices of $H_{FF}$. Set $\{F(\phi)\}$ comprises candidate configurations of the controllable phase shifts. The function whose norm is maximized in Eq. 24 may be generally a function of $$H_i^{FF},$$

$F(\phi)$, and/or $H_{NF}$, for example, $$f(\{H_{DCS}[k]\}_{k \in 1 \dots K}, F(\phi), H_i^{FF}, , H_{NF}).$$

According to an embodiment, the estimate of $H_{FF}$ may be determined based on maximizing energy transferred through the DCS 130 and by inversion of the channel model $H=H_0+H_{FF}F(\phi)H_{NF}$ or $H=H_0+H_{NF}F(\phi)H_{FF}$, depending on whether the transmitter 110 or the receiver 120 is in the near field of the DCS 130. The second configuration of the controllable phase shifts of the DCS 130 may be selected based on $$F_2(\phi) = \arg\max_{\{F(\phi)\}} \|H_{NF}F(\phi)\|^2. \tag{Eq. 25}$$

Alternatively, when the transmitter 110 is in the near field, Eq. 25 may be written as $$F_2(\phi) = \arg\max_{\{F(\phi)\}} \|F(\phi)H_{NF}\|^2.$$

This embodiment therefore enables selection of the controllable phase shifts based on knowledge of the near-field channel only and therefore, for example, information about the location of the far-field node is not needed. Also in this embodiment, an estimate of the composite radio channel may be determined based on the second reference signal(s) using any suitable channel estimation method.

If the transmitter 110 is in the near-field of the DCS 130, the estimate of $H_{FF}$ may be then be determined based on $$H_{FF}=(H-H_0)(F_2(\phi)H_{NF})^\dagger, \tag{Eq. 26}$$

where $(\ )^\dagger$ denotes pseudo inverse of a matrix. If the receiver 120 is in the near field of the DCS 130, the estimate of $H_{FF}$ may be determined based on $$H_{FF}=(H_{NF}F_2(\phi))^\dagger(H-H_0). \tag{Eq. 27}$$

According to an embodiment, the estimate of $H_{FF}$ may be determined based on a probabilistic distribution for $H_{FF}$. Information about the probabilistic distribution may be collected through measurements or it may comprise information about preferred directions, for example, sectors. The second configuration of the phase shifts, $F_2(\phi)$, may be determined based on maximizing the controllable phase shifts, $F(\phi)$, over $\mathbb{E}_{H_{FF}}\{\|H_{NF}F(\phi)H_{FF}\|^2\}$ computed over the distribution of $H_{FF}$, where $\mathbb{E}_{\{\cdot\}}\{\cdot\}$ denotes the expectation operator. Alternatively, it is possible to minimize any other criterion based on the inputs. The criterion may be, for example, the dimension of the spanned subspace, the rank of the matrix, the number of separable eigenvectors, the power distribution of the transferred eigenmodes, or the like. The criterion may be even constrained subject to a leakage criteria. Any combination of the criteria may be applied. Any suitable channel estimation method may be then applied to estimate the composite radio channel, H, based on the second reference signal(s) transmitted when the DCS 130 is configured with the determined second configuration of the phase shifts.

If the transmitter 110 is in the near field of the DCS 130, the estimate of $H_{FF}$ may be determined based on $$H_{FF}=(H-H_0)(F_2(\phi)H_{NF})^\dagger. \tag{Eq. 28}$$

If the receiver 120 is in the near field of the DCS 130, the estimate of $H_{FF}$ may be determined based on $$H_{FF}=(H_{NF}F_2(\phi))^{\dagger}(H-H_0). \tag{Eq. 29}$$

The above embodiments for the operation 403 enable estimation of the far-field channel $H_{FF}$ and also improve the channel estimation quality by increasing the signal-to-noise ratio of the second reference signal(s) by the enhanced propagation via the DCS 130.

Figure 7:
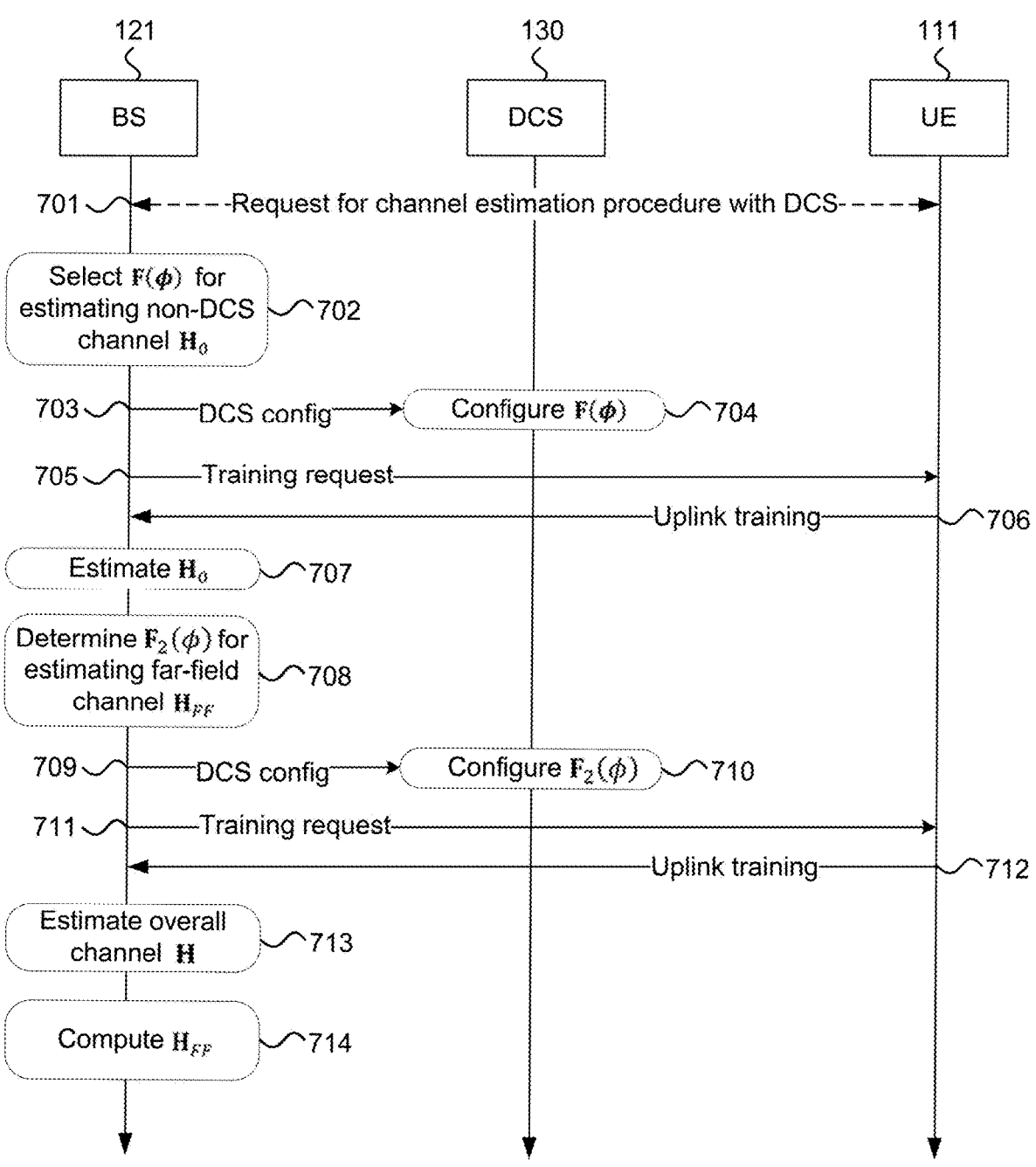
FIG. 7 illustrates an example of a signaling diagram and operations for uplink training based channel estimation at a base station, according to an embodiment of the present disclosure.

FIG. 7 illustrates an example of a signaling diagram and operations for uplink training based channel estimation at a base station, according to an embodiment of the present disclosure. A UE 111 is provided as an example of the transmitter 110 and the base station (BS) 121 is provided as an example of the receiver 120. The DCS 130 may be in the near field of the BS 121. It is however noted that similar procedure may be performed between any devices that are configured to estimate a radio channel and enable estimation of the radio channel by transmitting training signal(s).

At operation 701, the UE 111 and the BS 121 may initiate a channel estimation procedure. For example, the UE 111 or the BS 121 may transmit a request for a channel estimation procedure to the other one of these devices. The channel estimation request may be alternatively received from a third entity in the network. The request may indicate a request for estimating, or enabling estimation of, the different components of the radio channel in presence of the DCS 130.

At operation 702, the BS 121 may determine a first configuration of the controllable phase shifts, for example, corresponding to $F(\phi)$, for estimating the non-DCS channel $H_0$. The first configuration may be determined, for example, based on any embodiment described with reference to operation 402. It is noted that the BS 121 may be preconfigured with an estimate of the near-field channel $H_{NF}$ or the BS 121 may estimate the slowly varying near-field channel before or upon initiation of the channel estimation procedure.

At operation 703, the BS 121 may transmit a DCS configuration to the DCS 130. This DCS configuration may comprise the first configuration of the controllable phase shifts. The first configuration of the controllable phase shifts may be provided to the DCS 130 for use during transmission of the first reference signal(s), as described with reference to the operation 402. The first configuration of the controllable phase shifts may comprise one or more first sets of the controllable phase shifts, for example, sets of phase shifts to be applied sequentially at the DCS 130. The BS 121 may also transmit instructions to apply the first configuration of the controllable phase shifts at a first time period. The first time period may comprise transmission of the first reference signal(s). Alternatively, the BS 121 may transmit to the DCS 130 instructions to turn off or disable the DCS 130 for the first time period.

At operation 704, the DCS 130 may apply the received first configuration of the controllable phase shifts. For example, the DCS 130 may assign each reflective element a phase according to the received configuration and/or instructions. Alternatively, the DCS 130 may be turned off or disabled, either entirely or partially.

At operation 705, the BS 121 may transmit a training request to the UE 111. The BS 121 may hence inform the UE 111 that training can start by requesting it to send the training sequence.

At operation 706, the UE 111 may transmit uplink training signal(s) (cf. first reference signal(s) of the operation 402). Transmission of the uplink training signals may be in response to receiving the training request at operation 705.

With the DCS 130 configured with the first configuration of the controllable phase shifts, the propagation of the uplink training signal(s) via the DCS 130 to the BS 121 may be restricted and the non-DCS paths may be dominant. Any uplink signals suitable for use as reference for channel estimation may be used.

At operation 707, the BS 121 may estimate the non-DCS channel $H_0$, for example, based on any embodiment described with reference to operation 402.

At operation 708, the BS 121 may determine a second configuration of the controllable phase shifts, for example, corresponding to $F_2(\phi)$, for estimating the far-field channel $H_{FF}$. The second configuration may be determined, for example, based on any embodiment described with reference to the operation 403.

At operation 709, the BS 121 may transmit a DCS configuration to the DCS 130. This DCS configuration may comprise the second configuration of the controllable phase shifts. The second configuration of the controllable phase shifts may be provided to the DCS 130 for use during the transmission of the second reference signal(s), as described with reference to the operation 403. The second configuration of the controllable phase shifts may comprise one or more second sets of the controllable phase shifts, for example, sets of phase shifts to be applied sequentially at the DCS 130. The BS 121 may also transmit instructions to apply the second configuration of the controllable phase shifts at a second time period. The second time period may comprise transmission of the second reference signal(s). The second time period may be subsequent to the first time period.

At operation 710, the DCS 130 may apply the received second configuration of the controllable phase shifts, similar to the operation 704, for example, in response to receiving the second configuration of the controllable phase shifts and/or the associated instructions form the BS 121 at 709.

At operations 711 and 712, the BS 121 may transmit a training request and the UE 111 may transmit the uplink training signal(s), similar to the operations 705 and 706. The DCS 130 being now configured with the second configuration of the controllable phase shifts, the propagation of the uplink training signal(s) (cf. second training signal(s) of the operation 403) via the DCS 130 to the BS 121 may be enhanced.

At operation 713, the BS 121 may estimate the overall (composite) radio channel H based on the uplink reference signal(s) of the operation 712.

At operation 714, the BS 121 may compute the far-field channel $H_{FF}$, for example, based on any embodiment described with reference to the operation 403.

As discussed above, the BS 121 may exploit the information about the far-field channel to configure communication between the BS 121 and the UE 111. For example, parameters of a multi-user MIMO (multiple input multiple output) may be set to optimize the communication for current status of the far-field channel. The BS 121 may perform the configuration of the communication itself or transmit one or more of the estimated components of the radio channel to a network entity, which may have initially requested such estimate(s). The determined channel estimate (s) may be transmitted as such or quantized before transmission.

Figure 8:
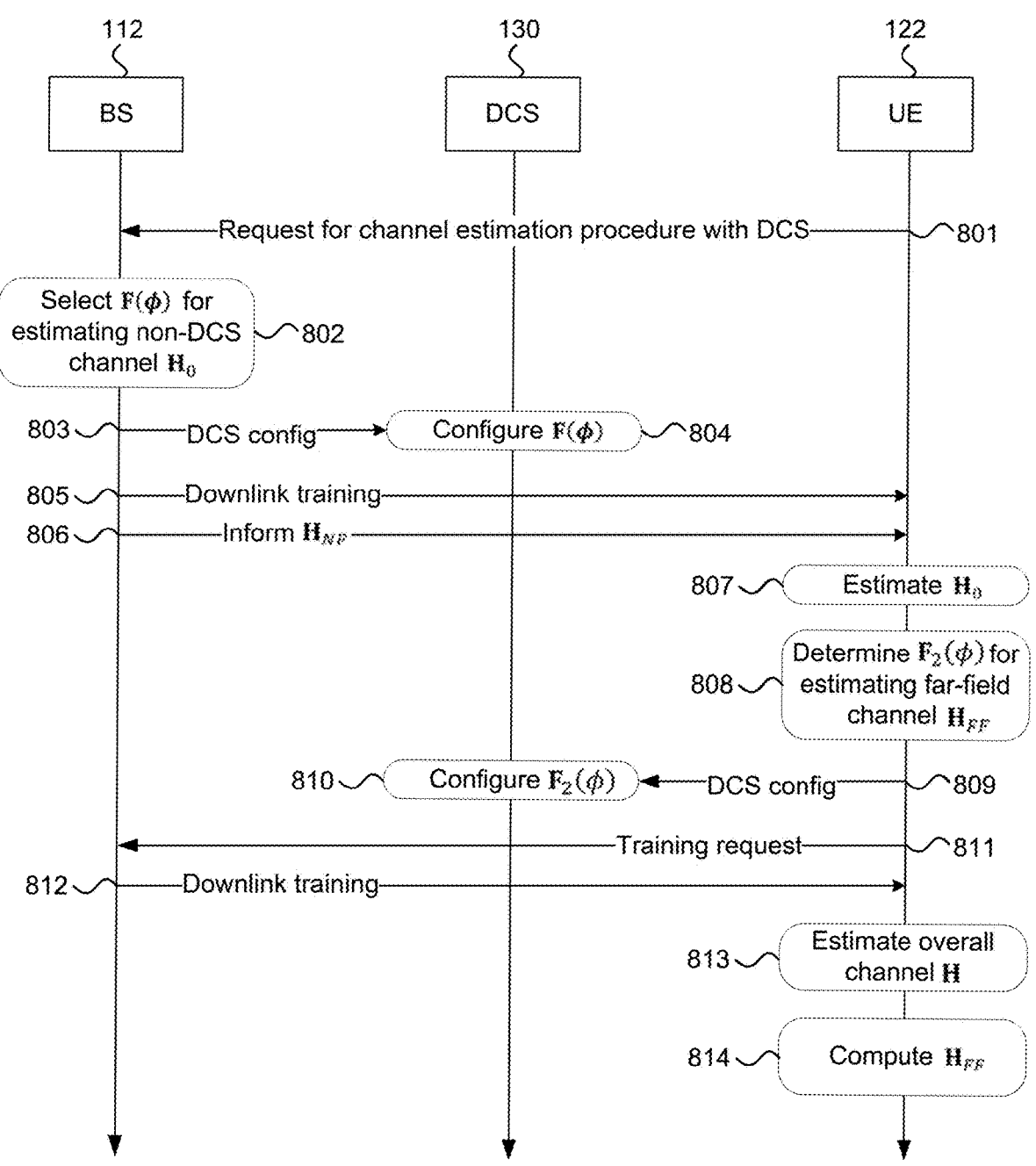
FIG. 8 illustrates an example of a signaling diagram and operations for downlink training based channel estimation at a user equipment (UE), according to an embodiment of the present disclosure.

FIG. 8 illustrates an example of a signaling diagram and operations for downlink training based channel estimation at a user equipment (UE) according to an embodiment of the present disclosure. A base station (BS) 112 is provided as an example of the transmitter 110 and UE 122 is provided as an example of the receiver 120. The DCS 130 may be in the near-field of the BS 112. It is, however, noted that similar procedure may be performed between any devices that are configured to estimate a radio channel and enable estimation of the radio channel by transmitting training signal(s).

At operation 801, the BS 112 and UE 122 may initiate a channel estimation procedure. For example, UE 122 may transmit a request for a channel estimation procedure to the BS 112. The request may indicate estimation of the different components of the radio channel in presence of the DCS 130.

At operation 802, the BS 112 may determine a first configuration of the controllable phase shifts for estimating the non-DCS channel $H_0$, similar to operation 702. Again, the BS 112 may be preconfigured with an estimate of the near-field channel $H_{NF}$ or the BS 112 may estimate the slowly varying near-field channel before or upon initiation of the channel estimation procedure.

At operation 803, the BS 112 may transmit a DCS configuration to DCS 130, similar to the operation 703. This DCS configuration may comprise the first configuration of the controllable phase shifts to restrict propagation of the downlink training signal(s) via the DCS 130.

At operation 804, the DCS 130 may apply the received first configuration of the controllable phase shifts, similar to the operation 704.

At operation 805, the BS 112 may transmit downlink training signal(s) (cf. first reference signal(s) of the operation 402). With the DCS 130 configured with the first configuration of the controllable phase shifts, the propagation of the downlink training signal(s) via the DCS 130 to the UE 122 may be restricted and the non-DCS paths may be dominant. Any downlink signals suitable for use as reference for channel estimation may be used.

At operation 806, the BS 112 may transmit the estimate of the near-field channel $H_{NF}$ to the UE 122. The BS 112 may also inform the UE 122 about characteristics of the DCS 130. The characteristics of the DCS 130 may comprise information enables the UE 122 to configure the DCS 130. For example, the characteristics may comprise a communication channel for configuration, the potential states for the phases $\phi$, a diffusion state, or the like. The characteristics may comprise the dimension, size, number, and/or position of reflective elements 132, radiation patterns in any form quantized or not. The characteristics, for example, when specified in a quantized form, may be, for example, in the form of a codebook, for example, a codebook of possible configurations of the DCS 130. In general, the characteristics may comprise any information that enables the UE 122 to compute an appropriate filter $F(\phi)$ adapted to the provided knowledge of $H_{NF}$ and the estimated channel. Alternatively, information about the near-field channel $H_{NF}$ may be provided to the base station 121 or another entity controlling the process in order to configure the DCS 130.

At operation 807, the UE 122 may estimate the non-DCS channel $H_0$, for example, based on any embodiment described with reference to the operation 402.

At operation 808, the UE 122 may determine a second configuration of the controllable phase shifts, for example, corresponding to $F_2(\phi)$, for estimating the far-field channel $H_{FF}$. The second configuration may be determined, for example, based on any embodiment described with reference to the operation 403.

At operation 809, the UE 122 may transmit a DCS configuration to the DCS 130, similar to the operation 709 performed by the BS 121. This DCS configuration may comprise the second configuration of the controllable phase shifts to enhance propagation of the downlink training signal(s) via the DCS 130.

At operation 810, the DCS 130 may apply the received second configuration of the controllable phase shifts, similar to the operation 710.

At operation 811, the UE 122 may transmit a training request to the BS 112, similar to the operation 711 performed by the BS 121.

At operation 812, the BS 112 may transmit the downlink training signal(s), similar to operation 805. The DCS 130 being configured with the second configuration of the controllable phase shifts, the propagation of the downlink training signal(s) (cf. second training signal(s) of the operation 403) via the DCS 130 to the UE 122 may be enhanced. Transmission of the downlink training signal(s) may be in response to receiving the training request at the operation 811.

At operation 813, the UE 122 may estimate the overall (composite) radio channel H based on the downlink reference signal(s) of the operation 812

At operation 814, the UE 122 may compute the far-field channel $H_{FF}$, for example, according to one or more embodiments of the operation 403.

Once the far-field channel $H_{FF}$ has been estimated, the UE 122 may transmit one or more of the estimated components of the radio channel to the BS 112 or another network entity, which may have initially requested such estimate(s), optionally after quantization of the channel estimate(s). The BS 112 or the other network entity may receive the estimate of the far-field channel and configure communication between the BS 112 and the UE 122 based on this estimate. Additionally, an estimate of the composite radio channel H may be transmitted to the BS 112.

According to an embodiment, an estimate of $H_0$ and H, or quantized version(s) thereof, may be sent to the BS 112. In this embodiment, the BS 112 may compute $H_{FF}$, for example, a closed-loop training scenario.

Figure 9:
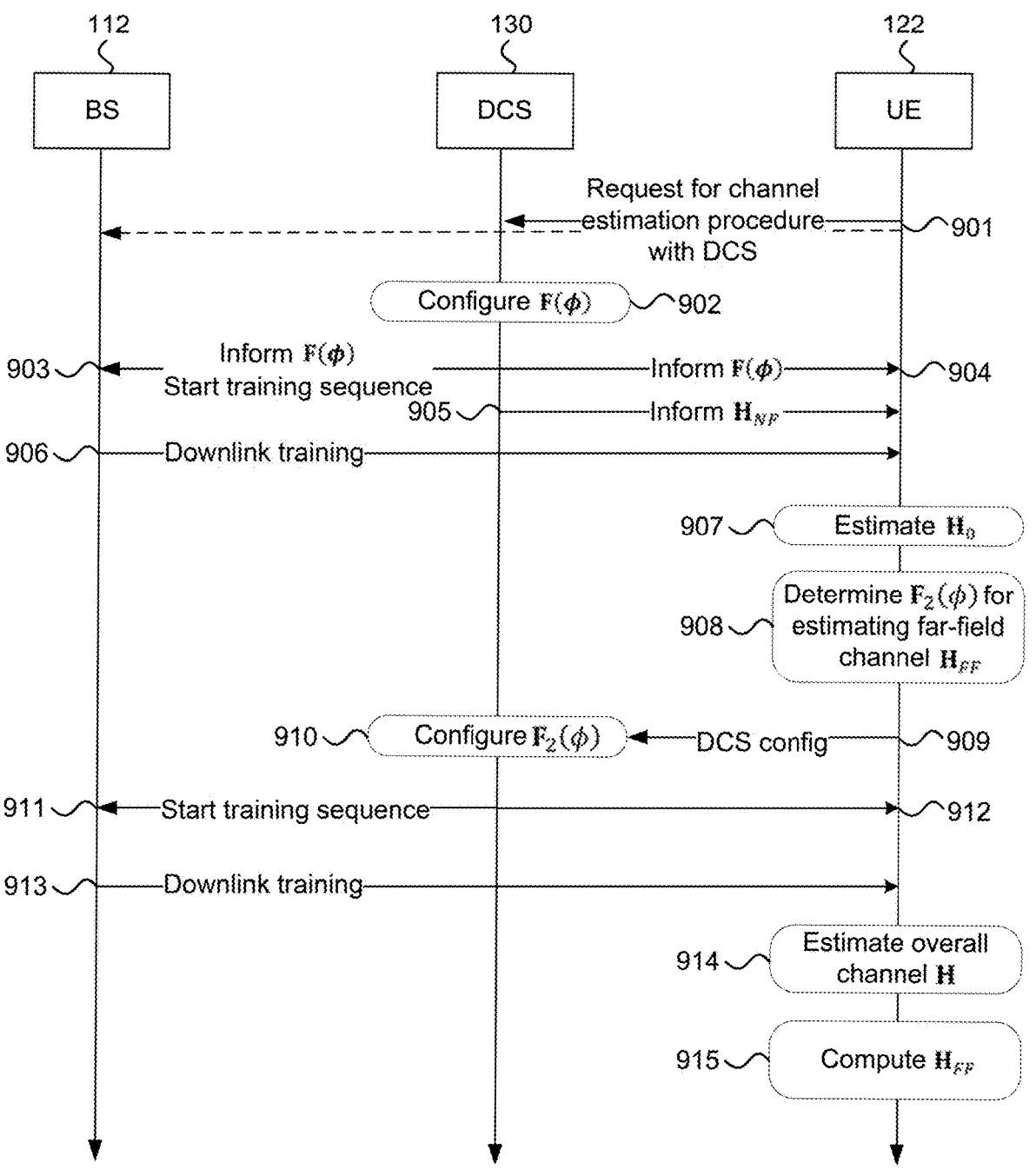
FIG. 9 illustrates another example of a signaling diagram and operations for downlink training based channel estimation at a user equipment (UE), according to an embodiment of the present disclosure.

FIG. 9 illustrates another example of a signaling diagram and operations for downlink training based channel estimation at a user equipment (UE) according to an embodiment of the present disclosure. In this example, information about the configurations of the phase shifts may be mainly located at the DCS 130, which may be part of the network, but not necessarily depending on the particular base station (BS) 112.

At operation 901, the procedure may be initiated transmitting a channel estimation request either by the UE 122, as illustrated the figure, or by the BS 112 or a third network entity. In this example, it is assumed that channel estimation is requested by the UE 122 for the particular serving BS 112. This information may be targeted to the DCS 130 or to both the DCS 130 and the BS 112. The request may indicate estimation of the different components of the radio channel in presence of the DCS 130.

At operation 902, the DCS 130 may determine a first configuration of the controllable phase shifts, for example, corresponding to $F(\phi)$, for estimating the non-DCS channel $H_0$. The first configuration may be determined, for example, based on any embodiment of the operation 402. The DCS 130 may be preconfigured with an estimate of the near-field channel $H_{NF}$, or the DCS 130 may obtain an estimate of the slowly varying near-field channel before or upon initiation of the channel estimation procedure. The DCS 130 may apply the determined first configuration of the controllable phase shifts.

At operation 903, the DCS 130 may transmit an indication of the first configuration of the controllable phase shifts to the BS 112. The DCS 130 may also request the BS 112 to start transmitting downlink training signal(s), e.g. training sequence(s). The DCS 130 may also transmit to the BS 112 instructions to transmit the downlink training signal(s) (cf. first training signal(s) of the operation 402) at a first time period.

At operation 904, the DCS 130 may transmit an indication of the first configuration of the controllable phase shifts to the UE 122.

At operation 905, the DCS 130 may transmit an estimate of the near-field channel $H_{NF}$ to the UE 122.

At operation 906, the BS 112 may transmit downlink training signal(s) (cf. first reference signal(s) of the operation 402), similar to the operation 805.

At operations 907, 908, 909, the UE 122 may estimate the non-DCS channel $H_0$, determine the second configuration of the controllable phase shifts for estimating the far-field channel $H_{FF}$, and transmit a DCS configuration comprising the second configuration of the controllable phase shifts to the DCS 130, similar to the operations 807, 808, 809, respectively.

At operation 910, the DCS 130 may apply the received second configuration of the controllable phase shifts, similar to the operation 710.

At operation 911, the DCS 130 may request the BS 112 to start transmitting downlink training signal(s), similar to the operation 903.

At operation 912, the DCS 130 may inform the UE 112 about the upcoming transmission of the downlink training signal(s).

At operation 913, the BS 112 may transmit the downlink training signal(s), similar to the operation 812.

At operations 914 and 915, the UE 122 may estimate the overall (composite) radio channel H and compute the far-field channel $H_{FF}$, similar to the operations 813 and 814, respectively.

Once the far-field channel $H_{FF}$ has been estimated, the UE 122 may transmit one or more of the estimated components of the radio channel to the BS 112 or another network entity, which may have initially requested such estimate(s), optionally after quantization of the channel estimate(s). The BS 112 or the other network entity may receive the estimate of the far-field channel and configure communication between the BS 112 and the UE 122 based on this estimate. It is noted that the DCS-assisted channel estimation of FIG. 9 may be also embodied such that the roles of the BS 112 and the UE 110 are reversed, for example, such that the BS 112 performs the channel estimation based on uplink training signal(s) transmitted by the UE 122, similar to the embodiment of FIG. 7.

Figure 10:
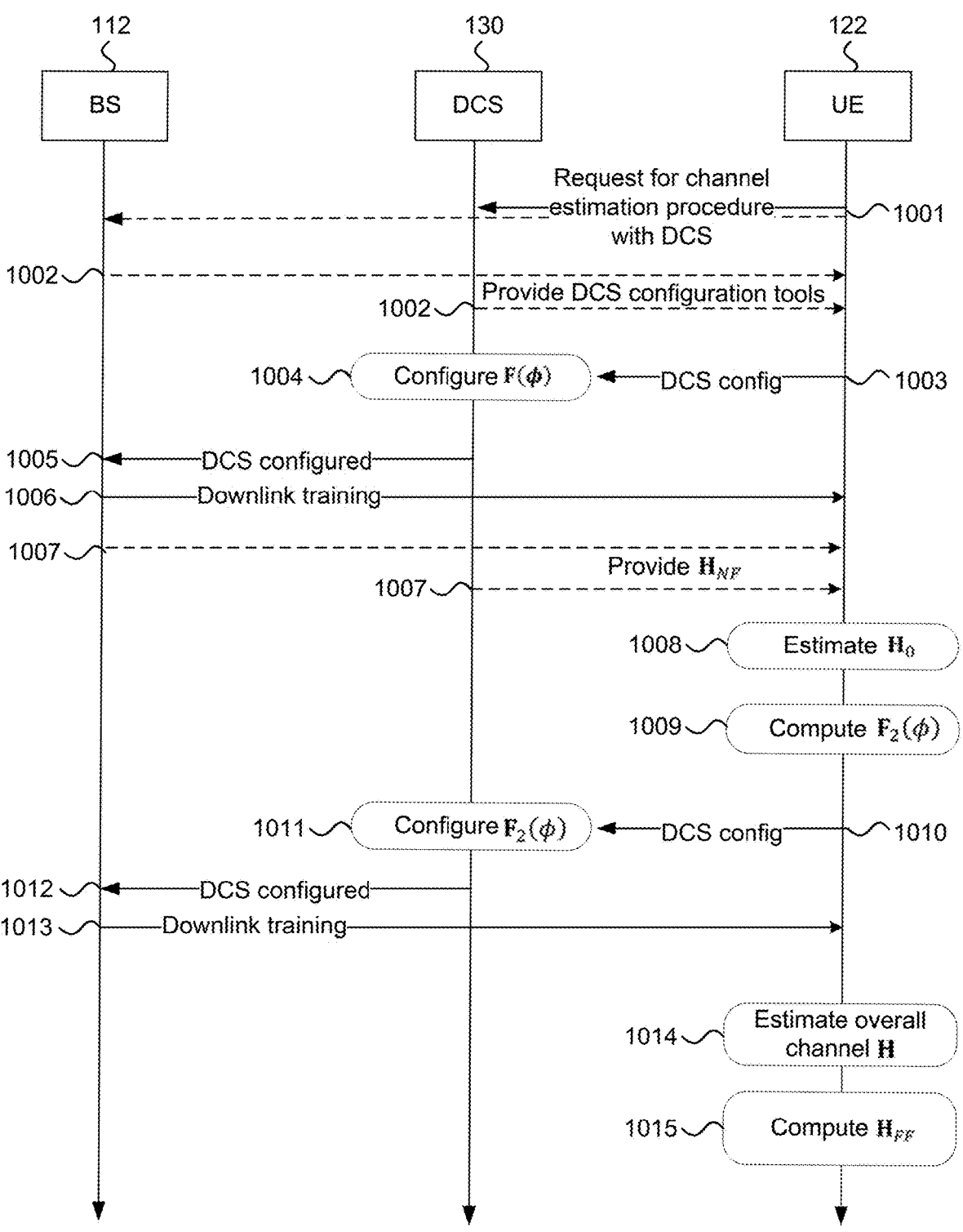
FIG. 10 illustrates another example of a signaling diagram and operations for downlink training based channel estimation at a user equipment (UE), according to an embodiment of the present disclosure.

FIG. 10 illustrates another example of a signaling diagram and operations for downlink training based channel estimation at a user equipment (UE) according to an embodiment of the present disclosure.

At operation 1001, the procedure may be initiated by transmitting a channel estimation request either by the UE 122, as illustrated the figure, or by the BS 112 or a third network entity, similar to operation 901.

At operation 1002, the BS 112 and/or the DCS 130 or any other involved network component may provide DCS configuration tools to the UE 122. The DCS configuration tools may comprise the characteristics of the DCS 130. The UE 122 may determine a first configuration of the controllable phase shifts, for example, similar to the operations performed by BS 121 at operation 703. This may be done based on the DCS configuration tools received from the BS 112 or DCS 130.

At operation 1003, the UE 122 may transmit an indication of the first configuration (F($\phi$)) of the controllable phase shifts to the DCS 130.

At operation 1004, the DCS 130 may configure its controllable phase shifts based on the first configuration received from the UE 122.

At operation 1005, the DCS 130 may transmit a DCS configured indication to the BS 112 in order to inform the BS 112 about completion of the configuration of the controllable phase shifts at the DCS 130.

At operation 1006, the BS 112 may transmit downlink training signal(s) (cf. first reference signal(s) of the operation 402), similar to the operation 805.

At operation 1007, the BS 112 and/or the DCS 130 may provide information about the near-field channel $H_{NF}$ to the UE 122, for example, similar to the operation 806 or 905.

At operations 1008 to 1010, the UE 122 may estimate the non-DCS channel $H_0$, compute $F_2(\phi)$, and transmit a corresponding DCS configuration to the DCS 130, for example, similar to the operations 807 to 809, respectively.

At operation 1011, the DCS 130 may apply the received second configuration ($F_2(\phi)$) of the controllable phase shifts, for example, similar to the operation 710.

At operation 1012, the DCS 130 may transmit a DCS configured indication to the BS 112, similar to operation 1005.

At operation 1013, the BS 112 may transmit downlink training signal(s) (cf. second reference signal(s) of the operation 403), similar to the operation 812.

At operations 1014 and 1015, the UE 122 may estimate the overall (composite) radio channel H and compute the far-field channel $H_{FF}$, similar to the operations 813 and 814, respectively.

Once the far-field channel $H_{FF}$ has been estimated, the UE 122 may transmit one or more of the estimated components of the radio channel to the BS 112 or another network entity, which may have initially requested such estimate(s), optionally after quantization of the channel estimate(s). The BS 112 or the other network entity may receive the estimate of the far-field channel and configure communication between the BS 112 and the UE 122 based on this estimate. It is noted that the DCS-assisted channel estimation of FIG. 10 may be also embodied such that the roles of the BS 112 and the UE 110 are reversed, for example, such that the BS 112 performs the channel estimation based on uplink training signal(s) transmitted by the UE 122, similar to the embodiment of FIG. 7.

Figure 11:
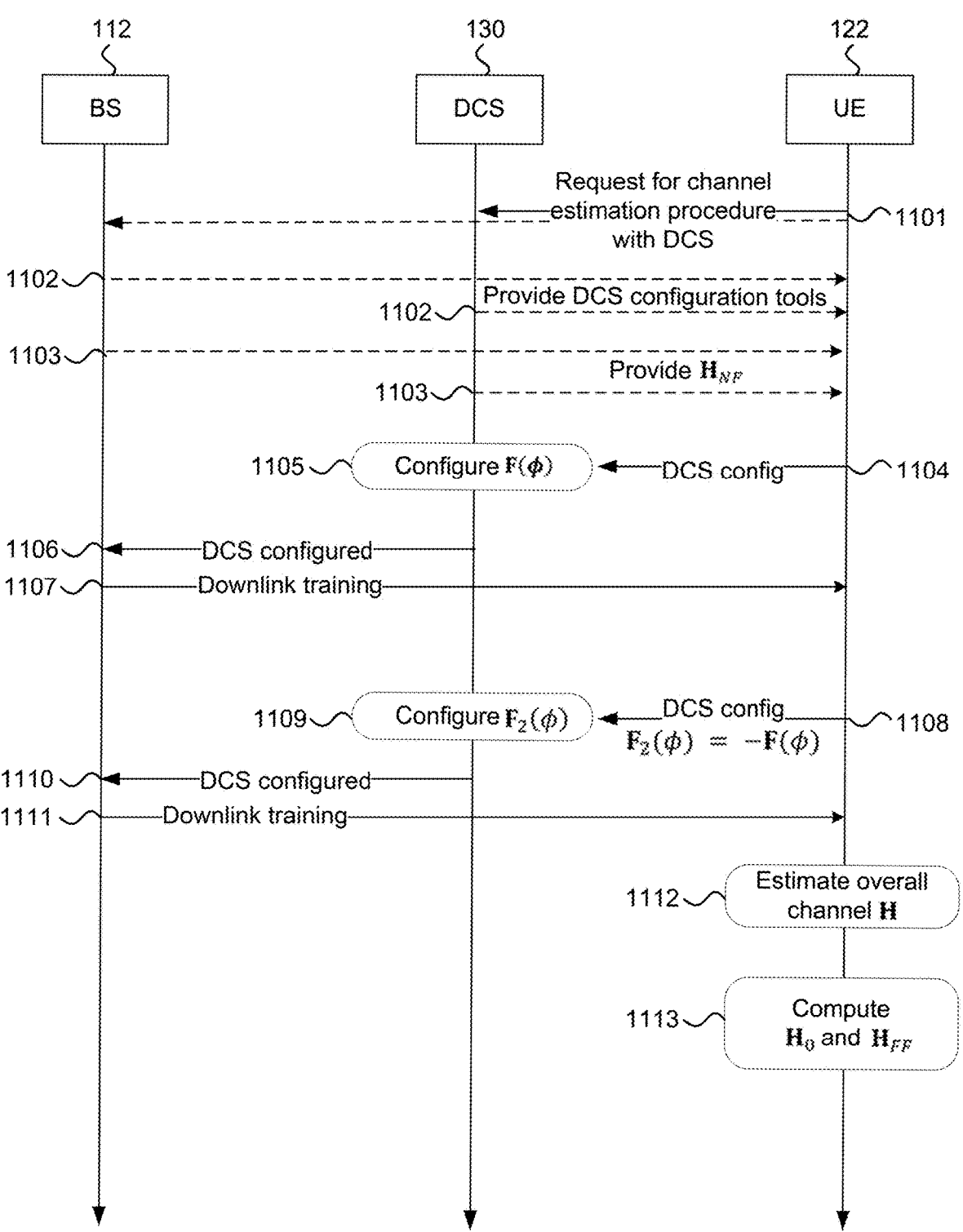
FIG. 11 illustrates another example of a signaling diagram and operations for downlink training based channel estimation with opposite filters at a user equipment (UE), according to an embodiment of the present disclosure.

FIG. 11 illustrates another example of a signaling diagram and operations for downlink training based channel estimation with opposite filters at a user equipment (UE) according to an embodiment of the present disclosure. This figure shows an example of acquisition of the measurements with opposite filters F($\phi$) and −F($\phi$) applied at the DCS 130. It is noted that the DCS-assisted channel estimation of FIG. 11 may be also embodied such that the roles of the BS 112 and the UE 110 are reversed, for example, such that the BS 112 performs the channel estimation based on uplink training signal(s) transmitted by the UE 122 or at the level of the DCS.

Operations 1101 and 1102 may be performed similar to the operations 1001 and 1002 of FIG. 10. Operation 1103 may be performed similar to the operation 1007, However, providing the DCS configuration tools may be done prior to configuring the DCS 130 with F($\phi$). Operations 1104 to 1107 may be similar to the operations 1003 to 1006, respectively.

At operation 1108, the UE 110 may transmit a second DCS configuration to the DCS 130. The second DCS configuration of the controllable phase shifts may comprise an opposite filter $(-F(\phi))$ compared to operations 1104 and 1105, that is $F_2(\phi)=-F(\phi)$. Operations 1110 to 1112 may be similar to the operations 1012 to 1014, respectively.

At operation 1113, the UE 112 may compute both $H_0$ and $H_{FF}$. The overall signal processing of the received signals may be done all at once and be based on addition and subtraction of the composite channel estimates corresponding to the different filters, as described above, or any kind of maximum likelihood solver based on the received signals. Once the far-field channel $H_{FF}$ has been estimated, the UE 122 may transmit one or more of the estimated components of the radio channel to the BS 112 or another network entity, which may have initially requested such estimate(s), optionally after quantization of the channel estimate(s). The BS 112 or the other network entity may receive the estimate of the far-field channel and configure communication between the BS 112 and the UE 122 based on this estimate. In the example of FIG. 10, the processing is done at the UE 122 but it may be in general performed at any entity that acquired the measurements. For example, the roles of the BS 112 and the UE 122 may be switched.

FIG. 12 illustrates an example of a method 1200 for estimating a radio channel according to an embodiment of the present disclosure.

At 1201, the method may comprise receiving, by a device from another device, at least one first reference signal for estimating the radio channel. The radio channel may comprise a first component between the other device and the device, a second component via a controllable scatterer, and a third component via the controllable scatterer. The controllable scatterer may be configured to alter a propagation of the at least one first reference signal from the controllable scatterer to the device.

At 1202, the method may comprise determining an estimate of the first component of the radio channel based on the at least one first reference signal.

At 1203, the method may comprise receiving at least one second reference signal. The controllable scatterer may be configured to alter a propagation of the at least one second reference signal from the controllable scatterer to the device.

At 1204, the method may comprise determining an estimate of the third component of the radio channel based on the at least one second reference signal and an estimate of the second component of the radio channel.

FIG. 13 illustrates an example of a method 1300 for enabling estimation of a radio channel, according to an embodiment of the present disclosure.

At 1301, the method may comprise transmitting, by a device to another device, at least one first reference signal for estimating the radio channel. The radio channel may comprise a first component between the device and the other device, a second component via a controllable scatterer, and a third component via the controllable scatterer. The controllable scatterer may be configured to alter a propagation of the at least one first reference signal from the controllable scatterer to the other device.

At 1302, the method may comprise transmitting at least one second reference signal. The controllable scatterer may be configured to alter a propagation of the at least one second reference signal from the controllable scatterer to the other device.

Further features of the methods directly result from the functionality of the transmitter 110, the receiver 120, the device 300, the UE 111 or 122, the base station 121 or 112, or the DSC 130, as described in the appended claims and throughout the specification, and are therefore not repeated here. Different variations of the methods may be also applied, as described in connection with the various example embodiments.

A device may be configured to perform or cause performance of any aspect of the method(s) described herein. Further, a computer program may comprise program code configured to cause performance of an aspect of the method(s) described herein, then the computer program is executed on a computer. Further, the computer program product may comprise a computer readable storage medium storing program code thereon, the program code comprising instruction for performing any aspect of the method(s) described herein. Further, a device may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the exemplary features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks, operations, or elements may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the methods, blocks, operations, or elements identified, but that such items do not comprise an exclusive list and a method or device may contain additional blocks, operations, and/or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A device for estimating a radio channel, comprising:
a communication interface; and
one or more processors;
wherein the communication interface is configured to:
receive, from another device, at least one first reference signal for estimating the radio channel, wherein the radio channel comprises a first component between the other device and the device, a second component via a controllable scatterer, and a third component via the controllable scatterer, wherein the controllable scatterer comprises a plurality of reflective elements configured to alter a propagation of the at least one first reference signal from the controllable scatterer to the device; and
receive at least one second reference signal, wherein the controllable scatterer is configured to alter a propagation of the at least one second reference signal from the controllable scatterer to the device;
wherein the one or more processors are configured to:
determine an estimate of the first component of the radio channel based on the at least one first reference signal; and
determine an estimate of the third component of the radio channel based on the at least one second reference signal and an estimate of the second component of the radio channel.

2. The device according to claim 1, wherein the communication interface is further configured to receive the estimate of the second component of the radio channel from the other device, wherein the second component of the radio channel is between the other device and the controllable scatterer, wherein the controllable scatterer is stationary with respect to the other device, and wherein the third component of the radio channel is between the controllable scatterer and the device.

3. The device according to claim 1, wherein the one or more processors are further configured to determine the estimate of the second component of the radio channel based on distances between at least one antenna of the device and the plurality of reflective elements of the controllable scatterer, wherein the second component of the radio channel is between the device and the controllable scatterer, wherein the controllable scatterer is stationary with respect to the device, and wherein the third component of the radio channel is between the controllable scatterer and the other device.

4. The device according to claim 1, wherein the controllable scatterer is configured with a first configuration of a plurality of controllable phase shifts to restrict the propagation of the at least one first reference signal from the controllable scatterer to the device.

5. The device according to claim 4, wherein, in the first configuration of the plurality of controllable phase shifts, the controllable scatterer is configured to direct the at least one first reference signal away from the device or to spatially disperse energy of the at least one first reference signal.

6. The device according to claim 4, wherein the one or more processors are further configured to determine the first configuration of the plurality of controllable phase shifts based on minimizing a first utility function with respect to a plurality of candidate configurations of the plurality of controllable phase shifts.

7. The device according to claim 4, wherein, in the first configuration of the plurality of controllable phase shifts, the controllable scatterer is configured to sequentially apply different combinations of the plurality of controllable phase shifts, and wherein the one or more processors are further configured to determine the estimate of the first component of the radio channel based on a plurality of observations corresponding to the different combinations of the plurality of controllable phase shifts.

8. The device according to claim 4, wherein, in a first configuration of the plurality of controllable phase shifts, the controllable scatterer is configured to sequentially apply a first filter defined by a set of controllable phase shifts $F(\phi)$ and a first opposite filter $-F(\phi)$, and wherein the one or more processors are further configured to determine the estimate of the first component of the radio channel based on adding estimates of a composite radio channel corresponding to the first filter $F(\phi)$ and the first opposite filter $-F(\phi)$.

9. The device according to claim 1, wherein the controllable scatterer is configured with a second configuration of a plurality of controllable phase shifts to enhance the propagation of the at least one second reference signal from the controllable scatterer to the device.

10. The device according to claim 9, wherein the communication interface is further configured to transmit, to the controllable scatterer:
a first configuration of the plurality of controllable phase shifts for use during a transmission of the at least one first reference signal, wherein the first configuration of the plurality of controllable phase shifts comprises one or more first sets of the controllable phase shifts,
the second configuration of the plurality of controllable phase shifts for use during a transmission of the at least one second reference signal, wherein the second configuration of the plurality of controllable phase shifts comprises one or more second sets of the controllable phase shifts,
instructions to turn off the controllable scatterer for a first time period comprising the transmission of the at least one first reference signal,
instructions to apply the first configuration of the plurality of controllable phase shifts at the first time period, or
instructions to apply the second configuration of the plurality of controllable phase shifts at a second time period comprising the transmission of the at least one second reference signal.

11. The device according to claim 9, wherein, in the second configuration of the plurality of controllable phase shifts, the controllable scatterer is configured to direct the at least one second reference signal towards the device.

12. The device according to claim 9, wherein the one or more processers are further configured to determine the second configuration of the plurality of controllable phase shifts based on maximizing a second utility function with respect to a plurality of candidate configurations of the plurality of controllable phase shifts.

13. The device according to claim 9, wherein the one or more processers are further configured to:
determine an estimate of a composite radio channel, H, based on the at least one second reference signal; and
determine an estimate of the third component of the radio channel based on minimizing a third utility function with respect to a plurality of candidate estimates of the third component of the radio channel.

14. The device according to claim 13, wherein, in the second configuration of the plurality of controllable phase shifts, the controllable scatterer is configured to sequentially apply a second filter defined by the set of controllable phase shifts $F_2(\phi)$ and a second opposite filter $-F_2(\phi)$, and wherein the device is further configured to determine the estimate of the third component of the radio channel based on subtracting estimates of the composite radio channel corresponding to the second filter $F_2(\phi)$ and the second opposite filter $-F_2(\phi)$.

15. The device according to claim 9, wherein the one or more processors are further configured to:

determine a plurality of estimates of a composite radio channel based on a plurality of second reference signals comprising the at least one second reference signal;

determine a plurality of estimates of the third component of the radio channel, $H_{FF}$, wherein the plurality of estimates of the third component of the radio channel and the second configuration of the plurality of controllable phase shifts, $F_2(\phi)$, are determined based on $$H_{FF}, F_2(\phi) = \arg\max_{H_i^{FF} \in \mathcal{H}, \{F(\phi)\}} f(\{H[k] - H_0\}_{k=1 \ldots k}),$$

wherein H[k] is a k-th estimate among K estimations of the composite radio channel, $$H_i^{FF}$$

is an i-th member of a codebook $\mathcal{H}$ of channel matrices of the third component of the radio channel, and $\{F(\phi)\}$ comprises a plurality of candidate configurations of the plurality of controllable phase shifts; and determine the estimate of the third component of the radio channel based on the plurality of estimates of the third component of the radio channel.

16. The device according to claim 9, further configured to:

determine the second configuration of the plurality of controllable phase shifts, $F_2(\phi)$, based on $$F_2(\phi) = \arg\max_{\{F(\phi)\}}\|H_{NF}F(\phi)\|^2 \text{ or } F_2(\phi) = \arg\max_{\{F(\phi)\}}\|F(\phi)H_{NF}\|^2,$$

wherein $H_{NF}$ is the estimate of the second component of the radio channel and $\{F(\phi)\}$ comprises a plurality of candidate configurations of the plurality of controllable phase shifts;

determine an estimate of a composite radio channel, H, based on the at least one second reference signal; and determine the estimate of the third component of the radio channel, $H_{FF}$, based on $$H_{FF} = (H - H_0)(F_2(\phi)H_{NF})^\dagger \text{ or }$$

$$H_{FF} = (H_{NF}F_2(\phi))^\dagger(H - H_0),$$

wherein $H_0$ is the estimate of the first component of the radio channel, and $(\ )^\dagger$ denotes pseudo inverse of a matrix.

17. The device according to claim 9, wherein the one or more processors are further configured to:

determine the second configuration of the plurality of controllable phase shifts, $F_2(\phi)$, based on maximizing the plurality of controllable phase shifts over $\mathbb{E}_{H_{FF}}\{\|H_{NF}F(\phi)H_{FF}\|^2\}$ computed over a distribution of the third component of the radio channel, $H_{FF}$, wherein $H_{NF}$ is the estimate of the second component of the radio channel, and $\mathbb{E}\{\ \}$ is an expectation operator;

determine an estimate of a composite radio channel, H, based on the at least one second reference signal; and determine the estimate of the third component of the radio channel, $H_{FF}$, based on $$H_{FF} = (H - H_0)(F_2(\phi)H_{NF})^\dagger \text{ or }$$

$$H_{FF} = (H_{NF}F_2(\phi))^\dagger(H - H_0)$$

wherein $H_0$ is the estimate of the first component of the radio channel, and $(\ )^\dagger$ denotes pseudo inverse of a matrix.

18. The device according to claim 1, wherein the one or more processors are further configured to:

configure a communication between the device and the other device based on the estimate of the third component of the radio channel; or cause the communication interface to transmit the estimate of the third component of the radio channel to the other device.

19. A method for estimating a radio channel, performed by a device, comprising:

receiving, from another device, at least one first reference signal for estimating the radio channel, wherein the radio channel comprises a first component between the other device and the device, a second component via a controllable scatterer, and a third component via the controllable scatterer, wherein the controllable scatterer comprises a plurality of reflective elements configured to alter a propagation of the at least one first reference signal from the controllable scatterer to the device;

determining an estimate of the first component of the radio channel based on the at least one first reference signal;

receiving at least one second reference signal, wherein the controllable scatterer is configured to alter a propagation of the at least one second reference signal from the controllable scatterer to the device; and determining an estimate of the third component of the radio channel based on the at least one second reference signal and an estimate of the second component of the radio channel.

* * * * *